(12) United States Patent
Neumeier et al.

(10) Patent No.: US 10,169,455 B2
(45) Date of Patent: Jan. 1, 2019

(54) SYSTEMS AND METHODS FOR ADDRESSING A MEDIA DATABASE USING DISTANCE ASSOCIATIVE HASHING

(71) Applicant: INSCAPE DATA, INC., Irvine, CA (US)

(72) Inventors: Zeev Neumeier, Berkeley, CA (US); Brian Reed, Stamford, CT (US)

(73) Assignee: INSCAPE DATA, INC., Irvine, CA (US)

( * ) Notice: Subject to any disclaimer, the term of this patent is extended or adjusted under 35 U.S.C. 154(b) by 0 days.

(21) Appl. No.: 15/240,801

(22) Filed: Aug. 18, 2016

(65) Prior Publication Data

US 2017/0032033 A1 Feb. 2, 2017

Related U.S. Application Data

(63) Continuation of application No. 14/678,856, filed on Apr. 3, 2015, now Pat. No. 9,449,090, which is a (Continued)

(51) Int. Cl.
*G06F 17/30* (2006.01)
*H04N 5/445* (2011.01)
(Continued)

(52) U.S. Cl.
CPC .. *G06F 17/30858* (2013.01); *G06F 17/30799* (2013.01); *H04N 5/44591* (2013.01);
(Continued)

(58) Field of Classification Search
CPC ............. H04N 21/4532; H04N 21/462; H04N 21/4667; H04N 21/478; H04N 21/8126; H04N 21/8456; H04N 5/44591
(Continued)

(56) References Cited

U.S. PATENT DOCUMENTS

| | | |
|---|---|---|
| 4,677,466 A | 6/1987 | Lert, Jr. et al. |
| 4,697,209 A | 9/1987 | Kiewit et al. |
| | (Continued) | |

FOREIGN PATENT DOCUMENTS

| | | |
|---|---|---|
| CA | 2501316 | 9/2005 |
| CN | 1557096 | 12/2004 |
| | (Continued) | |

OTHER PUBLICATIONS

International Search Report and Written Opinion dated Mar. 31, 2015 for PCT Application No. PCT/US2014/072255, 8 pages.
(Continued)

*Primary Examiner* — Brian T Pendleton
*Assistant Examiner* — Alan H Luong
(74) *Attorney, Agent, or Firm* — Polsinelli LLP

(57) ABSTRACT

A system, method and computer program utilize a distance associative hashing algorithmic means to provide a highly efficient means to rapidly address a large database. The indexing means can be readily subdivided into a plurality of independently-addressable segments where each such segment can address a portion of related data of the database where the subdivided indexes of said portions reside entirely in the main memory of each of a multiplicity of server means. The resulting cluster of server means, each hosting an addressable sector of a larger database of searchable audio or video information, provides a significant improvement in the latency and scalability of an Automatic Content Recognition system, among other uses.

20 Claims, 28 Drawing Sheets

Related U.S. Application Data continuation-in-part of application No. 12/788,721, filed on May 27, 2010, now Pat. No. 8,595,781, and a continuation-in-part of application No. 12/788,748, filed on May 27, 2010, now Pat. No. 8,769,584, and a continuation-in-part of application No. 14/089,003, filed on Nov. 25, 2013, now Pat. No. 8,898,714, and a continuation-in-part of application No. 14/217,039, filed on Mar. 17, 2014, now Pat. No. 9,055,335, and a continuation-in-part of application No. 14/217,075, filed on Mar. 17, 2014, now Pat. No. 9,055,309, and a continuation-in-part of application No. 14/217,094, filed on Mar. 17, 2014, now Pat. No. 8,930,980, and a continuation-in-part of application No. 14/217,375, filed on Mar. 17, 2014, now Pat. No. 9,094,714, and a continuation-in-part of application No. 14/217,425, filed on Mar. 17, 2014, now Pat. No. 9,071,868, and a continuation-in-part of application No. 14/217,435, filed on Mar. 17, 2014, now Pat. No. 9,094,715, and a continuation-in-part of application No. 14/551,933, filed on Nov. 24, 2014.

(60) Provisional application No. 61/182,334, filed on May 29, 2009, provisional application No. 61/290,714, filed on Dec. 29, 2009, provisional application No. 61/791,578, filed on Mar. 15, 2013.

(51) Int. Cl.
*H04N 21/234* (2011.01)
*H04N 21/439* (2011.01)
*H04N 21/44* (2011.01)
*H04N 21/442* (2011.01)
*H04N 21/45* (2011.01)
*H04N 21/462* (2011.01)
*H04N 21/466* (2011.01)
*H04N 21/81* (2011.01)
*H04N 21/231* (2011.01)
*H04N 21/845* (2011.01)
*H04N 21/478* (2011.01)

(52) U.S. Cl.
CPC . *H04N 21/23109* (2013.01); *H04N 21/23418* (2013.01); *H04N 21/23424* (2013.01); *H04N 21/4394* (2013.01); *H04N 21/44008* (2013.01); *H04N 21/44204* (2013.01); *H04N 21/4532* (2013.01); *H04N 21/462* (2013.01); *H04N 21/4667* (2013.01); *H04N 21/8126* (2013.01); *H04N 21/8456* (2013.01); *H04N 21/478* (2013.01)

(58) Field of Classification Search
USPC ........ 725/19, 32, 34–36; 705/14.49; 709/226
See application file for complete search history.

(56) References Cited

U.S. PATENT DOCUMENTS

| | | |
|---|---|---|
| 4,739,398 A | 4/1988 | Thomas et al. |
| 5,019,899 A | 5/1991 | Boles et al. |
| 5,319,453 A | 6/1994 | Copriviza et al. |
| 5,436,653 A | 7/1995 | Ellis et al. |
| 5,481,294 A | 1/1996 | Thomas et al. |
| 5,557,334 A | 9/1996 | Legate |
| 5,572,246 A | 11/1996 | Ellis et al. |
| 5,812,286 A | 9/1998 | Li |
| 5,826,165 A | 10/1998 | Echeita et al. |
| 5,918,223 A | 6/1999 | Blum et al. |
| 6,008,802 A | 12/1999 | Goldschmidt et al. |
| 6,025,837 A | 2/2000 | Matthews, III et al. |
| 6,035,177 A | 3/2000 | Moses et al. |
| 6,064,764 A | 5/2000 | Bhaskaran et al. |
| 6,381,362 B1 | 4/2002 | Deshpande et al. |
| 6,415,438 B1 | 7/2002 | Blackketter et al. |
| 6,463,585 B1 | 10/2002 | Hendricks et al. |
| 6,469,749 B1 | 10/2002 | Dimitrova |
| 6,577,346 B1 | 6/2003 | Perlman |
| 6,577,405 B2 | 6/2003 | Kranz et al. |
| 6,628,801 B2 | 9/2003 | Powell et al. |
| 6,647,548 B1 | 11/2003 | Lu et al. |
| 6,675,174 B1 | 1/2004 | Bolle et al. |
| 6,771,316 B1 | 8/2004 | Iggulden |
| 6,804,659 B1 | 10/2004 | Graham et al. |
| 6,978,470 B2 | 12/2005 | Swix et al. |
| 6,990,453 B2 | 1/2006 | Wang et al. |
| 7,028,327 B1 | 4/2006 | Dougherty et al. |
| 7,039,930 B1 | 5/2006 | Goodman et al. |
| 7,050,068 B1 | 5/2006 | Bastos et al. |
| 7,051,351 B2 | 5/2006 | Goldman et al. |
| 7,064,796 B2 | 6/2006 | Roy et al. |
| 7,089,575 B2 | 8/2006 | Agnihotri et al. |
| 7,136,875 B2 | 11/2006 | Anderson et al. |
| 7,210,157 B2 | 4/2007 | Devara |
| 7,346,512 B2 | 3/2008 | Wang et al. |
| 7,421,723 B2 | 9/2008 | Harkness et al. |
| 7,590,998 B2 | 9/2009 | Hanley |
| 7,623,823 B2 | 11/2009 | Zito et al. |
| 7,793,318 B2 | 9/2010 | Deng |
| 7,933,451 B2 | 4/2011 | Kloer |
| 8,001,571 B1 | 8/2011 | Schwartz et al. |
| 8,094,872 B1 | 1/2012 | Yagnik et al. |
| 8,171,004 B1 | 5/2012 | Kaminski, Jr. et al. |
| 8,171,030 B2 | 5/2012 | Peira et al. |
| 8,175,413 B1 | 5/2012 | Ioffe et al. |
| 8,189,945 B2 | 5/2012 | Stojancic et al. |
| 8,195,689 B2 | 6/2012 | Ramanathan et al. |
| 8,229,227 B2 | 7/2012 | Stojancic et al. |
| 8,335,786 B2 | 12/2012 | Peira et al. |
| 8,364,703 B2 | 1/2013 | Ramanathan et al. |
| 8,385,644 B2 | 2/2013 | Stojancic et al. |
| 8,392,789 B2 | 3/2013 | Biscondi et al. |
| 8,494,234 B1 | 7/2013 | Djordjevic et al. |
| 8,522,283 B2 | 8/2013 | Laligand et al. |
| 8,595,781 B2 | 11/2013 | Neumeier et al. |
| 8,625,902 B2 | 1/2014 | Baheti et al. |
| 8,769,854 B1 | 7/2014 | Battaglia |
| 8,776,105 B2 | 7/2014 | Sinha et al. |
| 8,832,723 B2 | 9/2014 | Sinha et al. |
| 8,856,817 B2 | 10/2014 | Sinha et al. |
| 8,893,167 B2 | 11/2014 | Sinha et al. |
| 8,893,168 B2 | 11/2014 | Sinha et al. |
| 8,898,714 B2 | 11/2014 | Neumeier et al. |
| 8,918,804 B2 | 12/2014 | Sinha et al. |
| 8,918,832 B2 | 12/2014 | Sinha et al. |
| 8,930,980 B2 | 1/2015 | Neumeier et al. |
| 8,959,202 B2 | 2/2015 | Haitsma et al. |
| 9,055,309 B2 | 6/2015 | Neumeier et al. |
| 9,055,335 B2 | 6/2015 | Neumeier et al. |
| 9,071,868 B2 | 6/2015 | Neumeier et al. |
| 9,094,714 B2 | 7/2015 | Neumeier et al. |
| 9,094,715 B2 | 7/2015 | Neumeier et al. |
| 9,262,671 B2 | 2/2016 | Unzueta |
| 9,368,021 B2 | 6/2016 | Touloumtzis |
| 9,449,090 B2 | 9/2016 | Neumeier et al. |
| 9,465,867 B2 | 10/2016 | Hoarty |
| 9,838,753 B2 | 12/2017 | Neumeier et al. |
| 2001/0039658 A1 | 11/2001 | Walton |
| 2001/0044992 A1 | 11/2001 | Jahrling |
| 2002/0026635 A1 | 2/2002 | Wheeler et al. |
| 2002/0054695 A1 | 5/2002 | Bjorn et al. |
| 2002/0056088 A1 | 5/2002 | Silva, Jr. et al. |
| 2002/0059633 A1 | 5/2002 | Harkness et al. |
| 2002/0083060 A1 | 6/2002 | Wang et al. |
| 2002/0100041 A1* | 7/2002 | Rosenberg ......... G06Q 30/0241 725/32 |
| 2002/0105907 A1 | 8/2002 | Bruekers et al. |
| 2002/0120925 A1 | 8/2002 | Logan |
| 2002/0122042 A1 | 9/2002 | Bates |
| 2002/0162117 A1 | 10/2002 | Pearson et al. |

(56) References Cited

U.S. PATENT DOCUMENTS

| | | |
|---|---|---|
| 2002/0162118 A1 | 10/2002 | Levy et al. |
| 2003/0026422 A1 | 2/2003 | Gerheim et al. |
| 2003/0086341 A1 | 5/2003 | Wells |
| 2003/0121037 A1 | 6/2003 | Swix et al. |
| 2003/0121046 A1 | 6/2003 | Roy et al. |
| 2003/0147561 A1 | 8/2003 | Faibish et al. |
| 2003/0188321 A1 | 10/2003 | Shoff et al. |
| 2004/0045020 A1 | 3/2004 | Witt et al. |
| 2004/0059708 A1 | 3/2004 | Dean et al. |
| 2004/0183825 A1* | 9/2004 | Stauder ............... G06K 9/3266 715/723 |
| 2004/0216171 A1 | 10/2004 | Barone et al. |
| 2004/0221237 A1 | 11/2004 | Foote et al. |
| 2004/0226035 A1 | 11/2004 | Hauser |
| 2004/0240562 A1 | 12/2004 | Bargeron et al. |
| 2005/0015795 A1 | 1/2005 | Iggulden |
| 2005/0015796 A1 | 1/2005 | Bruckner et al. |
| 2005/0027766 A1 | 2/2005 | Ben |
| 2005/0066352 A1 | 3/2005 | Herley |
| 2005/0172312 A1 | 8/2005 | Lienhart et al. |
| 2005/0207416 A1 | 9/2005 | Rajkotia |
| 2005/0209065 A1 | 9/2005 | Schlosser et al. |
| 2005/0235318 A1 | 10/2005 | Grauch et al. |
| 2006/0029368 A1 | 2/2006 | Harville |
| 2006/0031914 A1 | 2/2006 | Dakss et al. |
| 2006/0133647 A1 | 6/2006 | Werner et al. |
| 2006/0153296 A1 | 7/2006 | Deng |
| 2006/0155952 A1 | 7/2006 | Haas |
| 2006/0173831 A1 | 8/2006 | Basso et al. |
| 2006/0187358 A1* | 8/2006 | Lienhart ............ G06F 17/30802 348/661 |
| 2006/0195857 A1 | 8/2006 | Wheeler et al. |
| 2006/0195860 A1 | 8/2006 | Eldering et al. |
| 2006/0245724 A1 | 11/2006 | Hwang et al. |
| 2006/0245725 A1 | 11/2006 | Lim |
| 2006/0253330 A1 | 11/2006 | Maggio et al. |
| 2007/0033608 A1 | 2/2007 | Eigeldinger |
| 2007/0050832 A1 | 3/2007 | Wright et al. |
| 2007/0061724 A1 | 3/2007 | Slothouber et al. |
| 2007/0061831 A1 | 3/2007 | Savoor et al. |
| 2007/0094696 A1 | 4/2007 | Sakai |
| 2007/0109449 A1 | 5/2007 | Cheung |
| 2007/0113263 A1 | 5/2007 | Chatani |
| 2007/0139563 A1 | 6/2007 | Zhong |
| 2007/0143796 A1 | 6/2007 | Malik |
| 2007/0168409 A1 | 7/2007 | Cheung |
| 2007/0180459 A1 | 8/2007 | Smithpeters et al. |
| 2007/0192782 A1 | 8/2007 | Ramaswamy |
| 2007/0250901 A1 | 10/2007 | McIntire et al. |
| 2007/0261070 A1 | 11/2007 | Brown et al. |
| 2007/0261075 A1 | 11/2007 | Glasberg et al. |
| 2007/0271300 A1 | 11/2007 | Ramaswamy |
| 2007/0274537 A1 | 11/2007 | Srinivasan |
| 2007/0300280 A1 | 12/2007 | Turner et al. |
| 2008/0044102 A1 | 2/2008 | Ekin |
| 2008/0046945 A1 | 2/2008 | Hanley |
| 2008/0089551 A1 | 4/2008 | Heather et al. |
| 2008/0138030 A1 | 6/2008 | Bryan et al. |
| 2008/0155588 A1 | 6/2008 | Roberts et al. |
| 2008/0155627 A1 | 6/2008 | O'Connor et al. |
| 2008/0172690 A1 | 7/2008 | Kanojia et al. |
| 2008/0208891 A1 | 8/2008 | Wang et al. |
| 2008/0240562 A1 | 10/2008 | Fukuda et al. |
| 2008/0263620 A1 | 10/2008 | Berkvens et al. |
| 2008/0276266 A1 | 11/2008 | Huchital et al. |
| 2008/0310731 A1 | 12/2008 | Stojancic et al. |
| 2008/0313140 A1* | 12/2008 | Pereira ............. G06F 17/30858 |
| 2009/0007195 A1 | 1/2009 | Beyabani |
| 2009/0024923 A1 | 1/2009 | Hartwig et al. |
| 2009/0028517 A1 | 1/2009 | Shen et al. |
| 2009/0052784 A1 | 2/2009 | Covell et al. |
| 2009/0087027 A1 | 4/2009 | Eaton et al. |
| 2009/0088878 A1 | 4/2009 | Otsuka et al. |
| 2009/0100361 A1 | 4/2009 | Abello et al. |
| 2009/0131861 A1 | 5/2009 | Braig et al. |
| 2009/0172728 A1 | 7/2009 | Shkedi et al. |
| 2009/0172746 A1 | 7/2009 | Aldrey et al. |
| 2009/0213270 A1* | 8/2009 | Ismert ............... G06F 17/30799 348/575 |
| 2009/0235312 A1 | 9/2009 | Morad et al. |
| 2010/0010648 A1 | 1/2010 | Bull et al. |
| 2010/0083299 A1 | 4/2010 | Nelson |
| 2010/0115543 A1 | 5/2010 | Falcon |
| 2010/0125870 A1 | 5/2010 | Ukawa et al. |
| 2010/0166257 A1 | 7/2010 | Wredenhagen |
| 2010/0199295 A1 | 8/2010 | Katpelly et al. |
| 2010/0235486 A1 | 9/2010 | White et al. |
| 2010/0269138 A1 | 10/2010 | Krikorian et al. |
| 2010/0306805 A1* | 12/2010 | Neumeier .......... H04N 5/44591 725/60 |
| 2010/0306808 A1 | 12/2010 | Neumeier et al. |
| 2011/0015996 A1 | 1/2011 | Kassoway et al. |
| 2011/0026761 A1 | 2/2011 | Radhakrishnan et al. |
| 2011/0041154 A1 | 2/2011 | Olson |
| 2011/0055552 A1 | 3/2011 | Francis et al. |
| 2011/0096955 A1 | 4/2011 | Voloshynovskiy et al. |
| 2011/0251987 A1 | 4/2011 | Buchheit |
| 2011/0247042 A1 | 10/2011 | Mallinson |
| 2011/0289099 A1 | 11/2011 | Quan |
| 2011/0299770 A1 | 12/2011 | Vaddadi et al. |
| 2012/0017240 A1 | 1/2012 | Shkedi |
| 2012/0054143 A1 | 3/2012 | Doig et al. |
| 2012/0095958 A1 | 4/2012 | Pereira et al. |
| 2012/0158511 A1 | 6/2012 | Lucero et al. |
| 2012/0174155 A1 | 7/2012 | Mowrey et al. |
| 2012/0177249 A1 | 7/2012 | Levy et al. |
| 2012/0185566 A1 | 7/2012 | Nagasaka |
| 2012/0272259 A1 | 10/2012 | Cortes |
| 2012/0294586 A1 | 11/2012 | Weaver et al. |
| 2012/0317240 A1 | 12/2012 | Wang |
| 2012/0324494 A1 | 12/2012 | Burger et al. |
| 2013/0007191 A1 | 1/2013 | Klappert et al. |
| 2013/0042262 A1 | 2/2013 | Riethmueller |
| 2013/0054356 A1 | 2/2013 | Richman et al. |
| 2013/0067523 A1 | 3/2013 | Etsuko et al. |
| 2013/0070847 A1 | 3/2013 | Iwamoto et al. |
| 2013/0108173 A1 | 5/2013 | Lienhart et al. |
| 2013/0139209 A1 | 5/2013 | Urrabazo et al. |
| 2013/0202150 A1 | 8/2013 | Sinha et al. |
| 2013/0209065 A1 | 8/2013 | Yeung |
| 2013/0290502 A1 | 10/2013 | Bilobrov |
| 2013/0297727 A1 | 11/2013 | Levy |
| 2013/0318096 A1 | 11/2013 | Cheung |
| 2014/0016696 A1 | 1/2014 | Nelson |
| 2014/0052737 A1 | 2/2014 | Ramanathan et al. |
| 2014/0082663 A1 | 3/2014 | Neumeier et al. |
| 2014/0088742 A1 | 3/2014 | Srinivasan |
| 2014/0130092 A1 | 5/2014 | Kunisetty |
| 2014/0188487 A1 | 7/2014 | Perez Gonzalez et al. |
| 2014/0193027 A1 | 7/2014 | Scherf |
| 2014/0195548 A1 | 7/2014 | Harron |
| 2014/0201769 A1 | 7/2014 | Neumeier et al. |
| 2014/0201772 A1 | 7/2014 | Neumeier et al. |
| 2014/0219554 A1 | 8/2014 | Yamaguchi et al. |
| 2014/0237576 A1 | 8/2014 | Zhang |
| 2014/0258375 A1* | 9/2014 | Munoz ............... H04L 67/2847 709/203 |
| 2014/0270489 A1 | 9/2014 | Jaewhan et al. |
| 2014/0270504 A1 | 9/2014 | Baum et al. |
| 2014/0270505 A1 | 9/2014 | McCarthy |
| 2014/0282671 A1 | 9/2014 | McMillan |
| 2014/0293794 A1* | 10/2014 | Zhong ............... H04L 47/215 370/235.1 |
| 2014/0344880 A1 | 11/2014 | Geller et al. |
| 2015/0026728 A1 | 1/2015 | Carter et al. |
| 2015/0100979 A1 | 4/2015 | Moskowitz et al. |
| 2015/0112988 A1 | 4/2015 | Pereira et al. |
| 2015/0120839 A1 | 4/2015 | Kannan et al. |
| 2015/0163545 A1 | 6/2015 | Freed et al. |
| 2015/0181311 A1 | 6/2015 | Navin et al. |
| 2015/0256891 A1 | 9/2015 | Kim et al. |
| 2015/0302890 A1 | 10/2015 | Ergen et al. |
| 2015/0382075 A1 | 12/2015 | Neumeier et al. |
| 2016/0227261 A1 | 8/2016 | Neumeier et al. |

(56) References Cited

U.S. PATENT DOCUMENTS

| | | |
|---|---|---|
| 2016/0286244 A1 | 9/2016 | Chang et al. |
| 2016/0307043 A1 | 10/2016 | Neumeier |
| 2016/0314794 A1 | 10/2016 | Leitman et al. |
| 2016/0353172 A1 | 12/2016 | Miller et al. |
| 2016/0359791 A1 | 12/2016 | Zhang et al. |
| 2017/0017645 A1 | 1/2017 | Neumeier et al. |
| 2017/0017651 A1 | 1/2017 | Neumeier et al. |
| 2017/0017652 A1 | 1/2017 | Neumeier et al. |
| 2017/0019716 A1 | 1/2017 | Neumeier et al. |
| 2017/0019719 A1 | 1/2017 | Neumeier et al. |
| 2017/0026671 A1 | 1/2017 | Neumeier et al. |
| 2017/0031573 A1 | 2/2017 | Kaneko |
| 2017/0032033 A1 | 2/2017 | Neumeier et al. |
| 2017/0032034 A1 | 2/2017 | Neumeier et al. |
| 2017/0134770 A9 | 5/2017 | Neumeier et al. |
| 2017/0186042 A1 | 6/2017 | Wong et al. |
| 2017/0311014 A1 | 10/2017 | Fleischman |
| 2017/0353776 A1 | 12/2017 | Holden et al. |

FOREIGN PATENT DOCUMENTS

| | | |
|---|---|---|
| CN | 101162470 | 4/2008 |
| CN | 1681304 | 7/2010 |
| CN | 102377950 | 3/2012 |
| CN | 101681373 | 9/2012 |
| EP | 248 533 | 8/1994 |
| EP | 1578126 | 9/2005 |
| EP | 1 760 693 | 3/2007 |
| EP | 2 084 624 | 8/2009 |
| EP | 2 352 289 | 8/2011 |
| EP | 2 541 963 A2 | 1/2013 |
| EP | 2 685 450 A1 | 1/2014 |
| GB | 2457694 | 8/2009 |
| WO | 0144992 | 6/2001 |
| WO | 2005/101998 | 11/2005 |
| WO | 2007/114796 | 10/2007 |
| WO | 2008/065340 A1 | 6/2008 |
| WO | 2009/131861 | 10/2009 |
| WO | 2009/150425 | 12/2009 |
| WO | 2010/135082 | 11/2010 |
| WO | 2011/090540 A2 | 7/2011 |
| WO | 2012/057724 | 5/2012 |
| WO | 2012/108975 | 8/2012 |
| WO | 2012/170451 | 12/2012 |
| WO | 2014/142758 | 9/2014 |
| WO | 2014/145929 A1 | 9/2014 |
| WO | 2015/100372 A1 | 7/2015 |
| WO | 2016/123495 | 8/2016 |
| WO | 2016/168556 | 10/2016 |
| WO | 2017/011758 | 1/2017 |
| WO | 2017/011792 | 1/2017 |

OTHER PUBLICATIONS

International Search Report and Written Opinion dated Apr. 26, 2016 for PCT Application No. PCT/US2016/015681,13 pages.
"How to: Watch from the beginning |About DISH" (Dec. 31, 2014) XP055265764, retrieved on Apr. 15, 2016 from URL:http://about.dish.com/blog/hopper/how-watch-beginning 2 pages.
International Search Report and Written Opinion dated Jun. 24, 2016 for PCT Application No. PCT/US2016/027691, 13 pages.
Gionis et al., "Similarity Search in High Dimension via Hashing", Proceedings of the 25th VLDB Conference, 1999, 12 pages.
Huang, "Bounded Coordinate System Indexing for Real-time Video Clip Search", Retrieved from the Internet:URL:http://staff.itee.uq.edu.aujzxf/papers/TOIS.pdf, Jan. 1, 2009, 32 pages.
Kim et al., "Edge-Based Spatial Descriptor Using Color Vector Angle for Effective Image Retrieval", Modeling Decisions for Artificial Intelligence; [Lecture Notes in Computer Science; Lecture Notes in Artificial Intelligence, Jul. 1, 2005, pp. 365-375.
Liu et al., "Near-duplicate video retrieval", ACM Computing Surveys, vol. 45, No. 4, Aug. 30, 2013, pp. 1-23.
International Search Report and Written Opinion dated Oct. 12, 2016 for PCT Application No. PCT/US2016/042522,13 pages.
International Search Report and Written Opinion dated Oct. 11, 2016 for PCT Application No. PCT/US2016/042621, 13 pages.
International Search Report and Written Opinion dated Oct. 20, 2016 for PCT Application No. PCT/US2016/042611,12 pages.
Scouarnec et al., "Cache policies for cloud-based systems:To keep or not to keep", 2014 IEEE 7th International Conference on Cloud Computing, IEEE XP032696624, Jun. 27, 2014, pp. 1-8.
International Search Report and Written Opinion dated Oct. 25, 2016 for PCT Application No. PCT/US2016/042564, 14 pages.
Anonymous; "Cache (computing)" Wikipedia, the free encyclopedia, URL:http://en.wikipedia.org/w/index.phpti tle=Cache (computing) &oldid=474222804, Jan. 31, 2012; 6 pages.
International Search Report and Written Opinion dated Oct. 24, 2016 for PCT Application No. PCT/US2016/042557, 11 pages.
Anil K. Jain, "Image Coding Via a Nearest Neighbors Image Model" IEEE Transactions on Communications, vol. Com-23, No. 3, Mar. 1975, pp. 318-331.
Lee et al., "Fast Video Search Algorithm for Large Video Database Using Adjacent Pixel Intensity Difference Quantization Histogram Feature" International Journal of Computer Science and Network Security, vol. 9, No. 9, Sep. 2009, pp. 214-220.
Li et al., A Confidence Based Recognition System for TV Commercial Extraction, Conferences in Research and Practice in Information Technology vol. 75, 2008.
International Search Report and Written Opinion dated Jul. 27, 2011 for PCT Application No. PCT/US2010/057153, 8 pages.
International Search Report and Written Opinion dated Aug. 31, 2011 for PCT Application No. PCT/US2010/057155, 8 pages.
International Search Report and Written Opinion dated Aug. 26, 2014 for PCT Application No. PCT/US2014/030782; 11 pages.
International Search Report and Written Opinion dated Jul. 21, 2014 for PCT Application No. PCT/US2014/030795; 10 pages.
International Search Report and Written Opinion, dated Jul. 25, 2014 for PCT Application No. PCT/US2014/030805, 10 pages.
Extended European Search Report dated Mar. 7, 2013 for European Application No. 12178359.1, 8 pages.
Extended European Search Report dated Oct. 11, 2013 for European Application No. 10844152.8, 19 pages.
Kabal (P.), Ramachandran (R.P.): The computation of line spectral frequencies using Chebyshev polynomials, IEEE Trans. on ASSP, vol. 34, No. 6, pp. 1419-1426, 1986.
Itakura (F.): Line spectral representation of linear predictive coefficients of speech signals, J. Acoust. Soc. Amer., vol. 57, Supplement No. 1, S35, 1975, 3 pages.
Bistritz (Y.), Pellerm (S.): Immittance Spectral Pairs (ISP) for speech encoding, Proc. ICASSP'93, pp. 11-9 to 11-12.
International Search Report and Written Opinion dated Mar. 8, 2016 for PCT Application No. PCT/ US2015/062945; 9 pages.
Extended European Search Report dated Dec. 21, 2016 for European Application No. 14763506.4, 11 pages.
Extended European Search Report dated Nov. 23, 2016 for European Application No. 14764182.3, 10 pages.
Extended European Search Report dated Jan. 24, 2017 for European Application No. 14762850.7, 12 pages.
Extended European Search Report dated Jun. 16, 2017, for European Patent Application No. 14873564.0, 8 pages.
U.S. Appl. No. 14/551,933 , "Final Office Action", dated May 23, 2016, 19 pages.
U.S. Appl. No. 14/551,933 , "Non-Final Office Action", dated Oct. 17, 2016, 15 pages.
U.S. Appl. No. 14/551,933 , "Non-Final Office Action", dated Dec. 31, 2015, 24 pages.
U.S. Appl. No. 14/551,933 , "Notice of Allowance", dated Mar. 21, 2017, 8 pages.
U.S. Appl. No. 14/217,039 , "Non-Final Office Action", dated May 23, 2014, 27 pages.
U.S. Appl. No. 14/217,039 , "Final Office Action", dated Nov. 7, 2014, 15 pages.
U.S. Appl. No. 14/217,039 , "Notice of Allowance", dated Jan. 29, 2015, 8 pages.

(56) References Cited

OTHER PUBLICATIONS

U.S. Appl. No. 14/678,856, "Non-Final Office Action", dated Dec. 1, 2015, 28 pages.
U.S. Appl. No. 14/678,856, "Notice of Allowance", dated May 20, 2016, 9 pages.
U.S. Appl. No. 14/217,075, "Non-Final Office Action", dated Jul. 16, 2014, 39 pages.
U.S. Appl. No. 14/217,075, "Notice of Allowance", dated Feb. 20, 2015, 51 pages.
U.S. Appl. No. 14/217,094, "Notice of Allowance", dated Sep. 4, 2014, 30 pages.
U.S. Appl. No. 14/217,375, "Non-Final Office Action", dated Apr. 1, 2015, 39 pages.
U.S. Appl. No. 14/217,375, "Notice of Allowance", dated Apr. 1, 2015, 31 pages.
U.S. Appl. No. 14/217,425, "Non-Final Office Action", dated Apr. 7, 2015, 12 pages.
U.S. Appl. No. 14/217,425, "Notice of Allowance", dated May 20, 2015, 15 pages.
U.S. Appl. No. 14/217,435, "Non-Final Office Action", dated Nov. 24, 2014, 9 pages.
U.S. Appl. No. 14/217,435, "Notice of Allowance", dated Jun. 5, 2015, 9 pages.
U.S. Appl. No. 15/011,099, "First Action Interview Office Action Summary", dated May 9, 2017, 6 pages.
U.S. Appl. No. 15/011,099, "First Action Interview Pilot Program Pre-Interview Communication", dated Feb. 28, 2017, 5 pages.
U.S. Appl. No. 12/788,721, "Non-Final Office Action", dated Mar. 28, 2012, 15 Pages.
U.S. Appl. No. 12/788,721, "Final Office Action", dated Aug. 15, 2012, 22 Pages.
U.S. Appl. No. 12/788,721, "Notice of Allowance", dated Aug. 15, 2013, 16 Pages.
U.S. Appl. No. 14/763,158, "Non-Final Office Action", dated Jun. 27, 2016, 16 Pages.
U.S. Appl. No. 14/763,158, "Final Office Action", dated Sep. 7, 2016, 12 Pages.
U.S. Appl. No. 14/763,158, "Notice of Allowance", dated Mar. 17, 2016, 8 Pages.
U.S. Appl. No. 14/807,849, "Non-Final Office Action", dated Nov. 25, 2015, 12 Pages.
U.S. Appl. No. 14/807,849, "Final Office Action", dated Apr. 19, 2016, 13 pages.
U.S. Appl. No. 14/807,849, "Non-Final Office Action", dated Feb. 28, 2017, 10 Pages.
U.S. Appl. No. 14/089,003, "Notice of Allowance", dated Jul. 30, 2014, 24 Pages.
U.S. Appl. No. 12/788,748, "Non-Final Office Action", dated Jan. 10, 2013, 10 Pages.
U.S. Appl. No. 12/788,748, "Final Office Action", dated Nov. 21, 2013, 13 Pages.
U.S. Appl. No. 12/788,748, "Notice of Allowance", dated Mar. 6, 2014, 7 Pages
U.S. Appl. No. 14/953,994, "Non-Final Office Action", dated Mar. 3, 2016, 34 Pages.
U.S. Appl. No. 14/953,994, "Final Office Action", dated Jun. 1, 2016, 36 Pages.
U.S. Appl. No. 14/953,994, "Notice of Allowance", dated Aug. 31, 2016, 15 Pages.
U.S. Appl. No. 14/807,849, "Final Office Action", dated Jun. 22, 2017, 10 pages.
U.S. Appl. No. 15/011,099, "Final Office Action", dated Jul. 24, 2017, 22 pages.
U.S. Appl. No. 15/240,815, "Non-Final Office Action", dated Aug. 23, 2017, 15 pages.
U.S. Appl. No. 15/211,345, "First Action Interview Pilot Program Pre-Interview Communication", dated Sep. 19, 2017, 8 pages.
U.S. Appl. No. 14/807,849, "Notice of Allowance", dated Nov. 30, 2017, 9 Pages.
U.S. Appl. No. 15/011,099, "Non-Final Office Action", dated Jan. 22, 2018, 23 pages.
U.S. Appl. No. 15/240,815, "Final Office Action", dated Mar. 2, 2018, 14 pages.
U.S. Appl. No. 15/211,345, "Final Office Action", dated Mar. 2, 2018, 14 pages.
Extended European Search Report dated Mar. 22, 2018 for European Application No. 15865033.3, 10 pages.
U.S. Appl. No. 15/099,842, "Final Office Action", dated Apr. 2, 2018, 8 pages.

\* cited by examiner

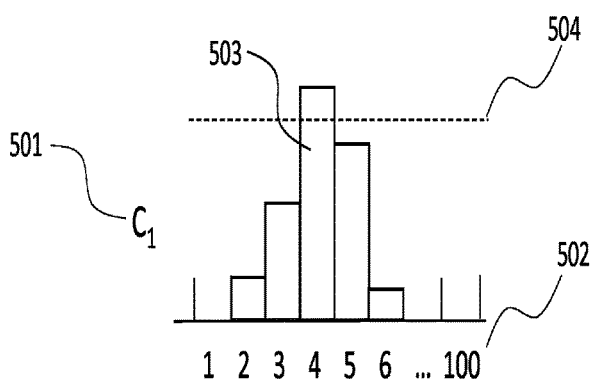
Fig. 5 Time Discount Binning
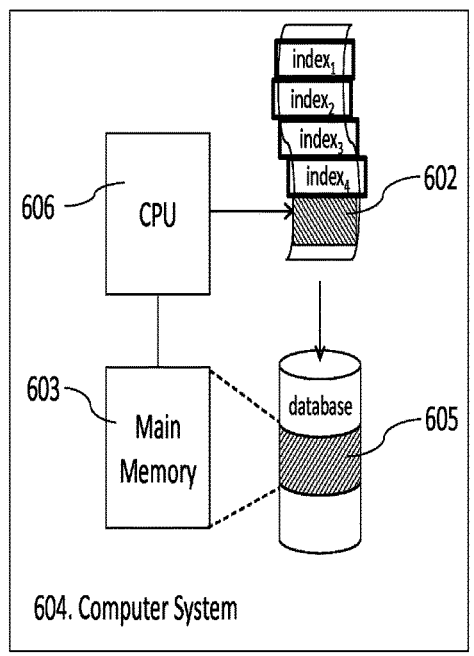
Fig. 6
Typical Computer Access
of Large Databases Fig. 9   Redistributing point values prior to applying hash function
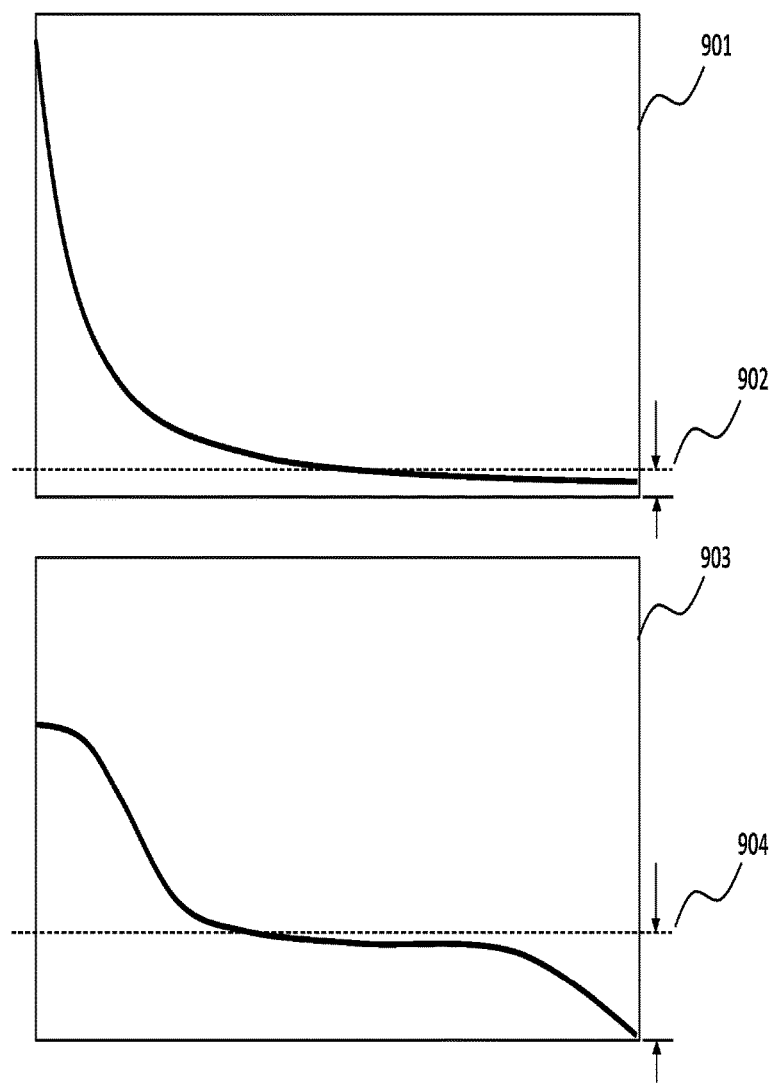

Fig. 9a    Finding the Median – Splitting at Zero Finds Data in 2 of 8 Sectors
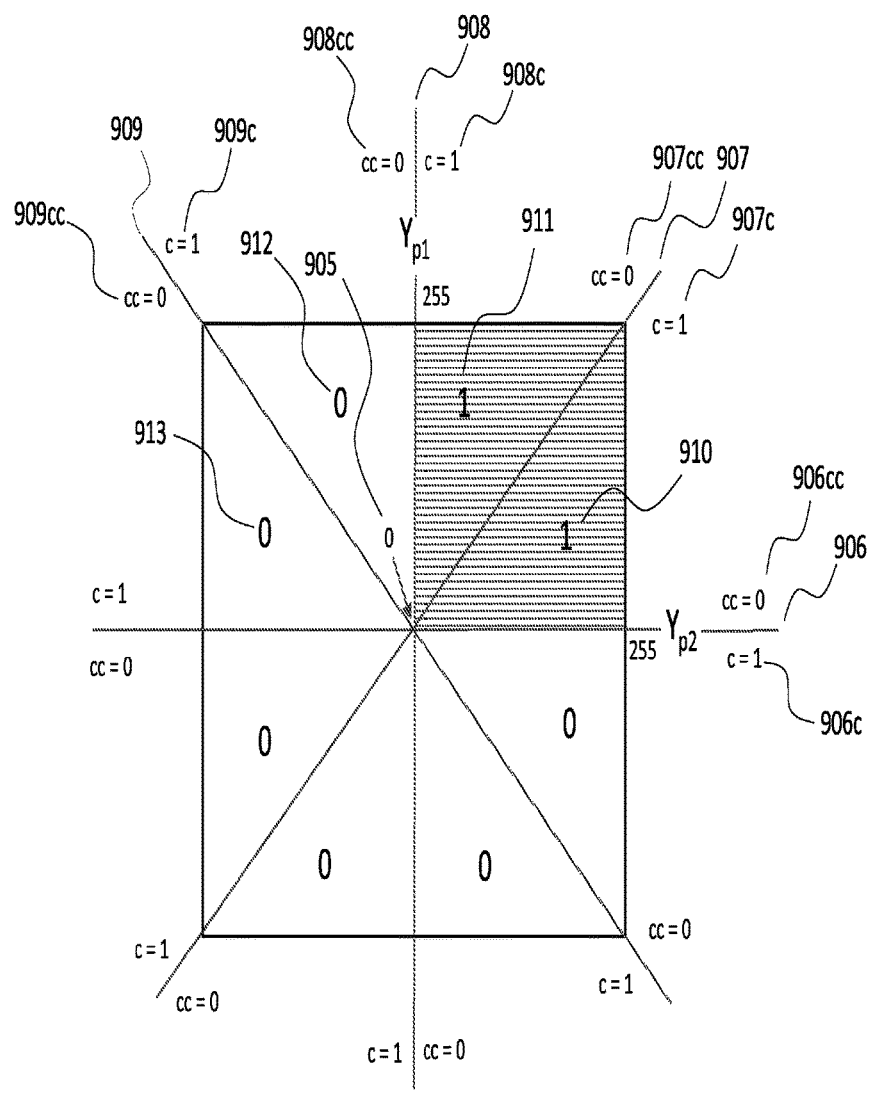

Fig. 9b  Finding the Median – Splitting at Median Finds Data in 8 of 8 Sectors
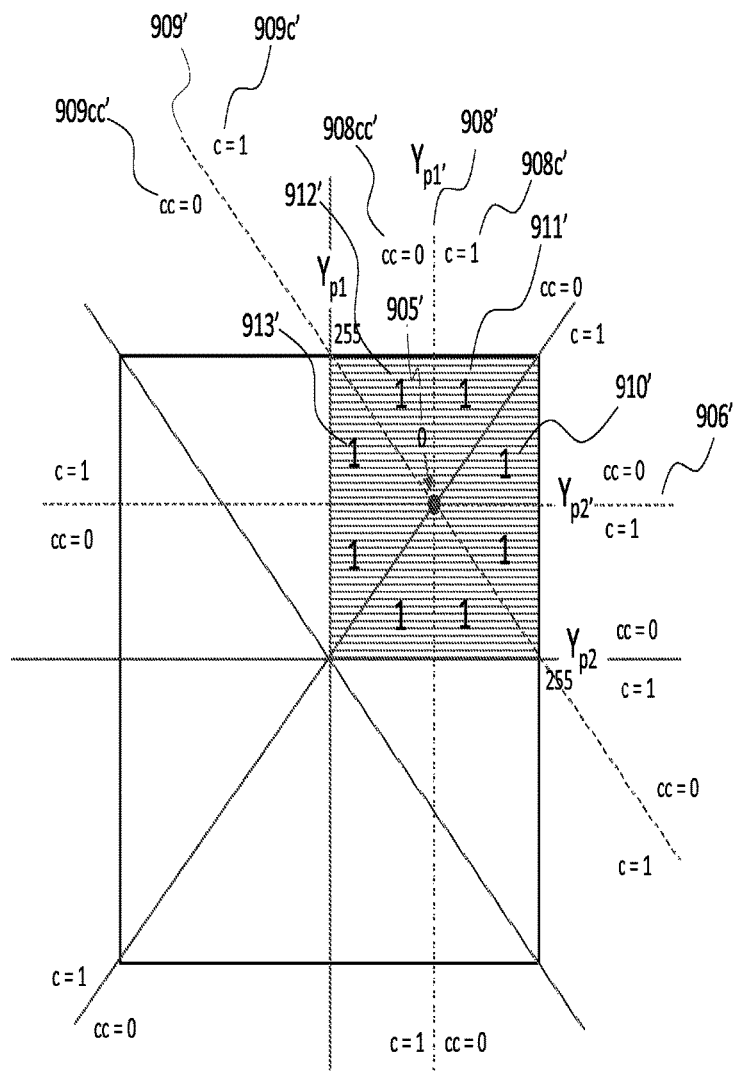

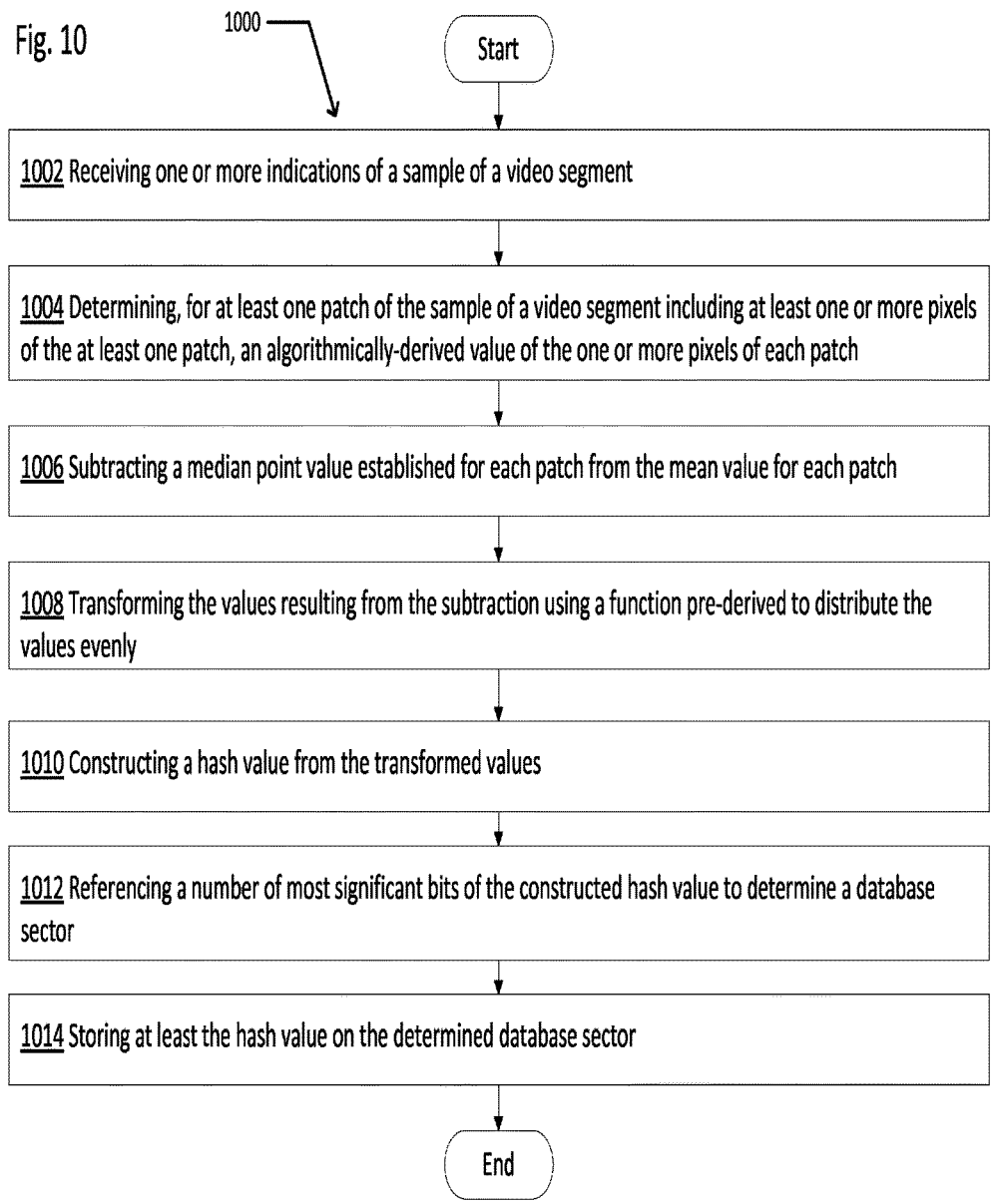

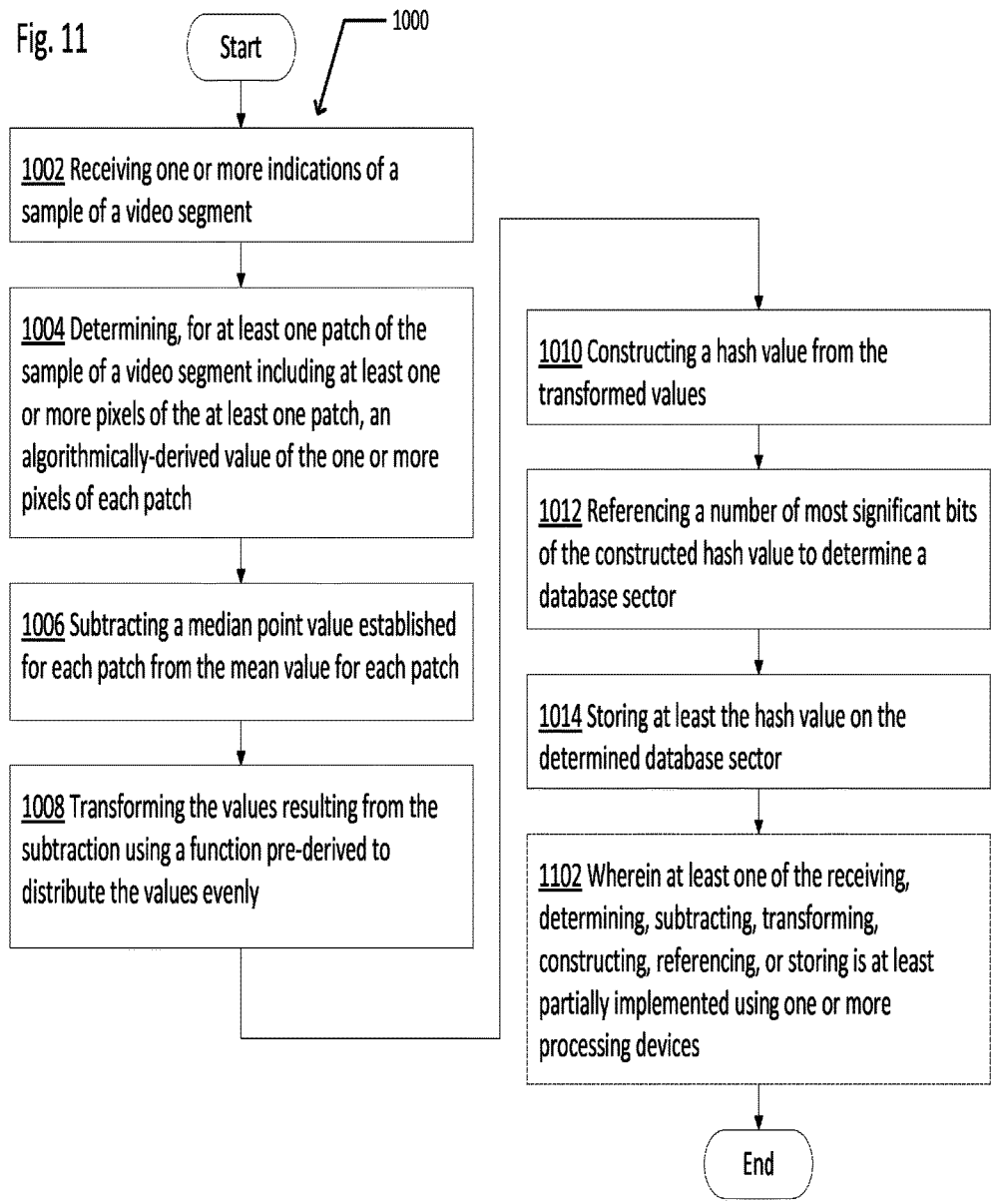

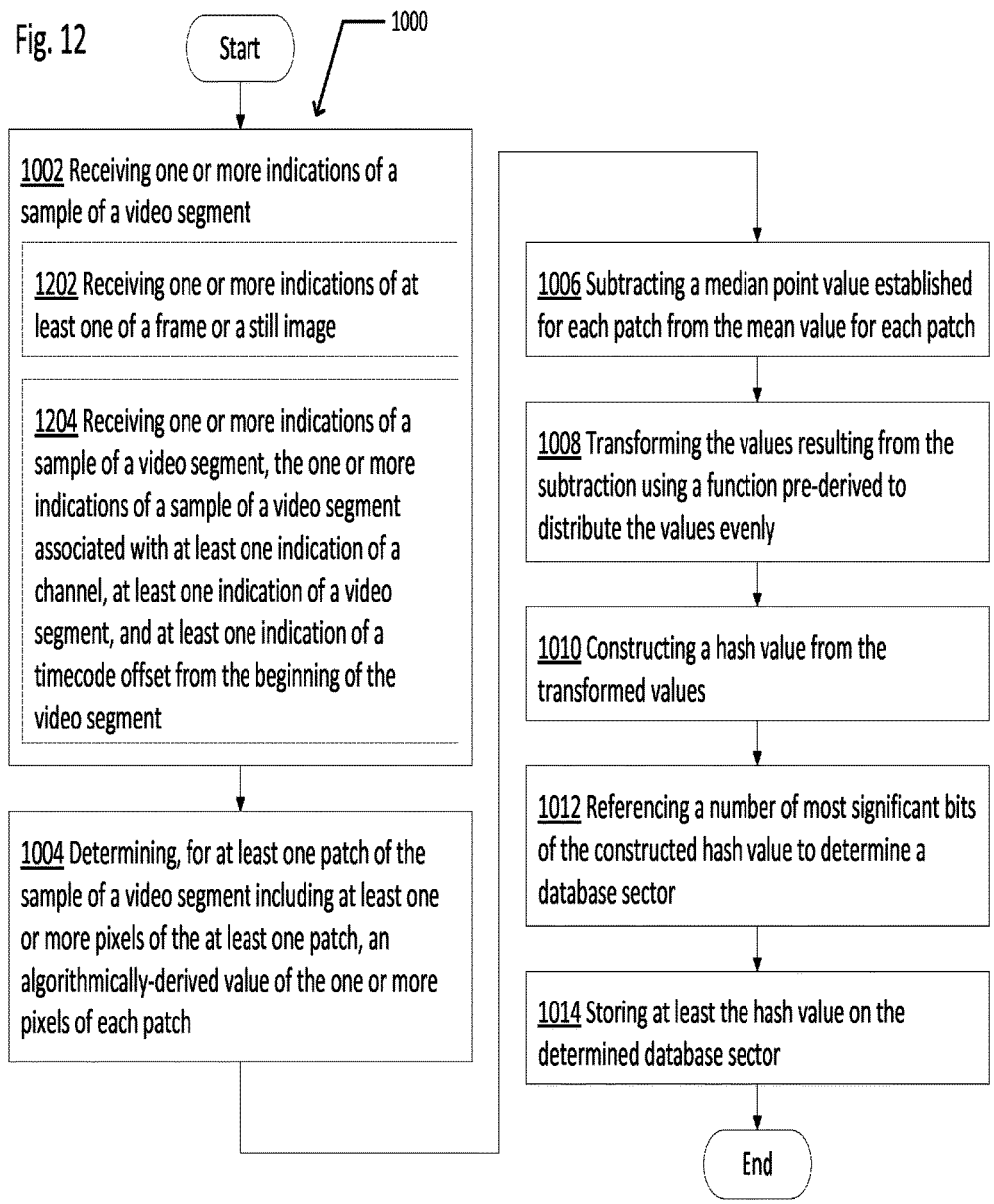

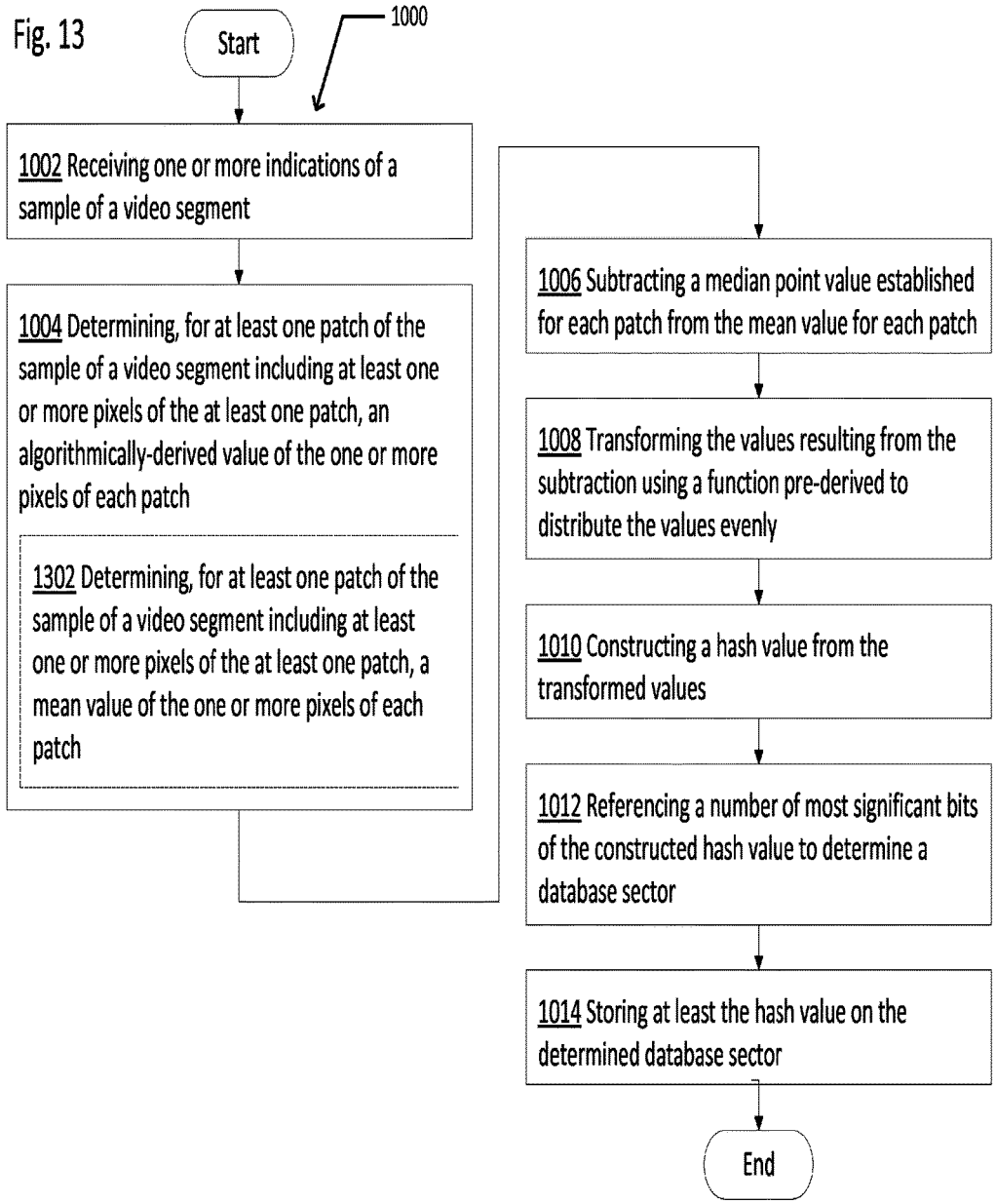

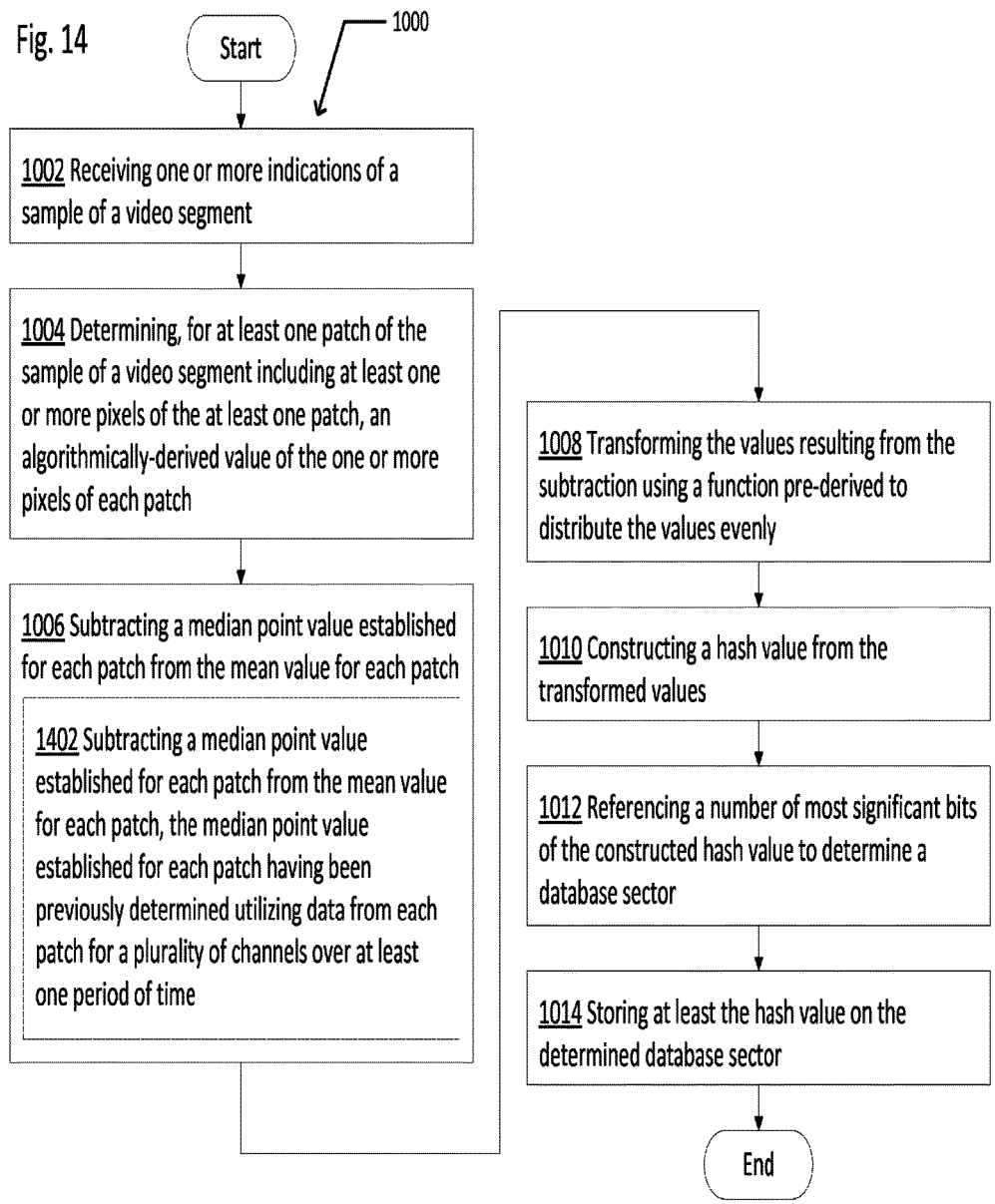

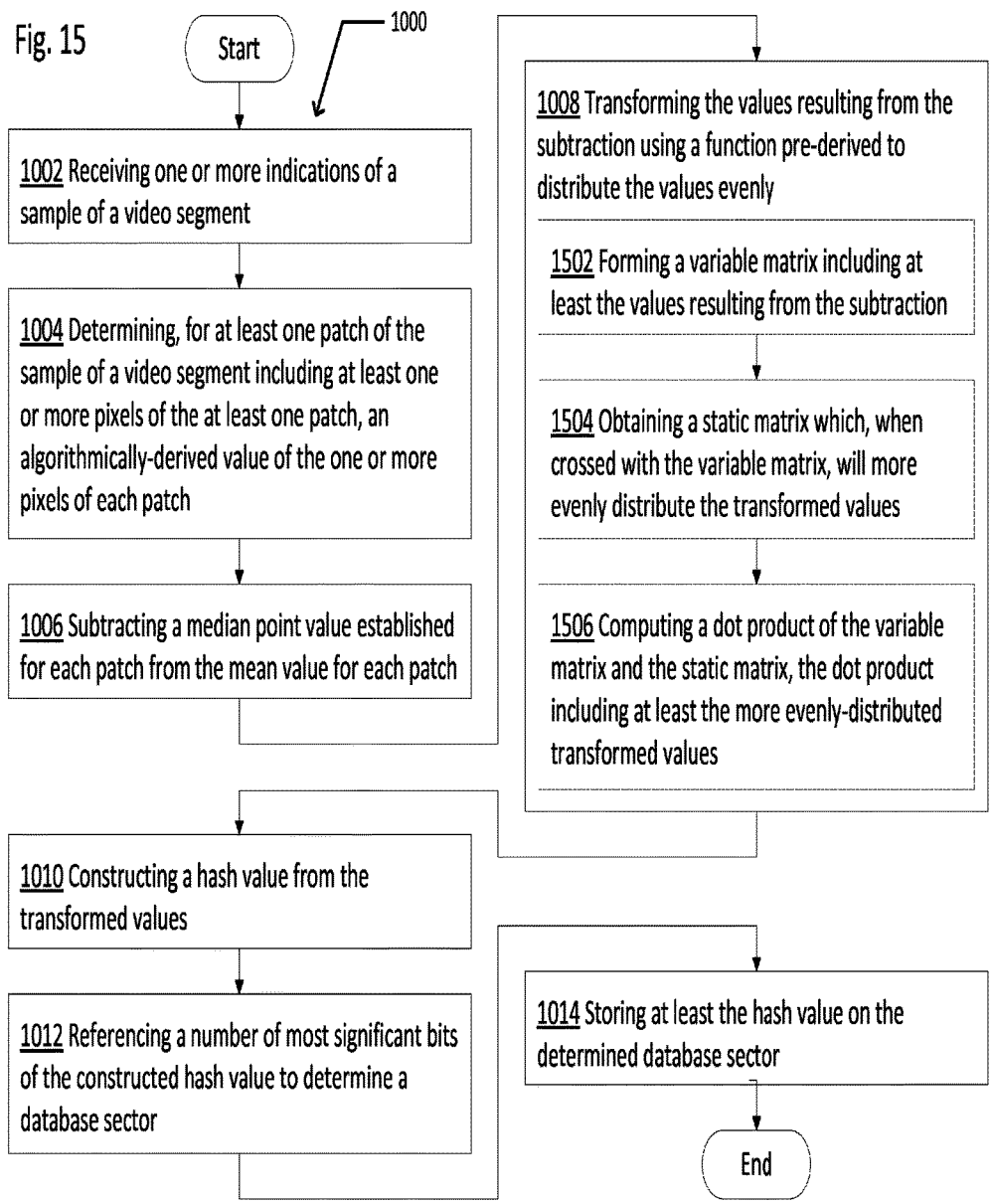

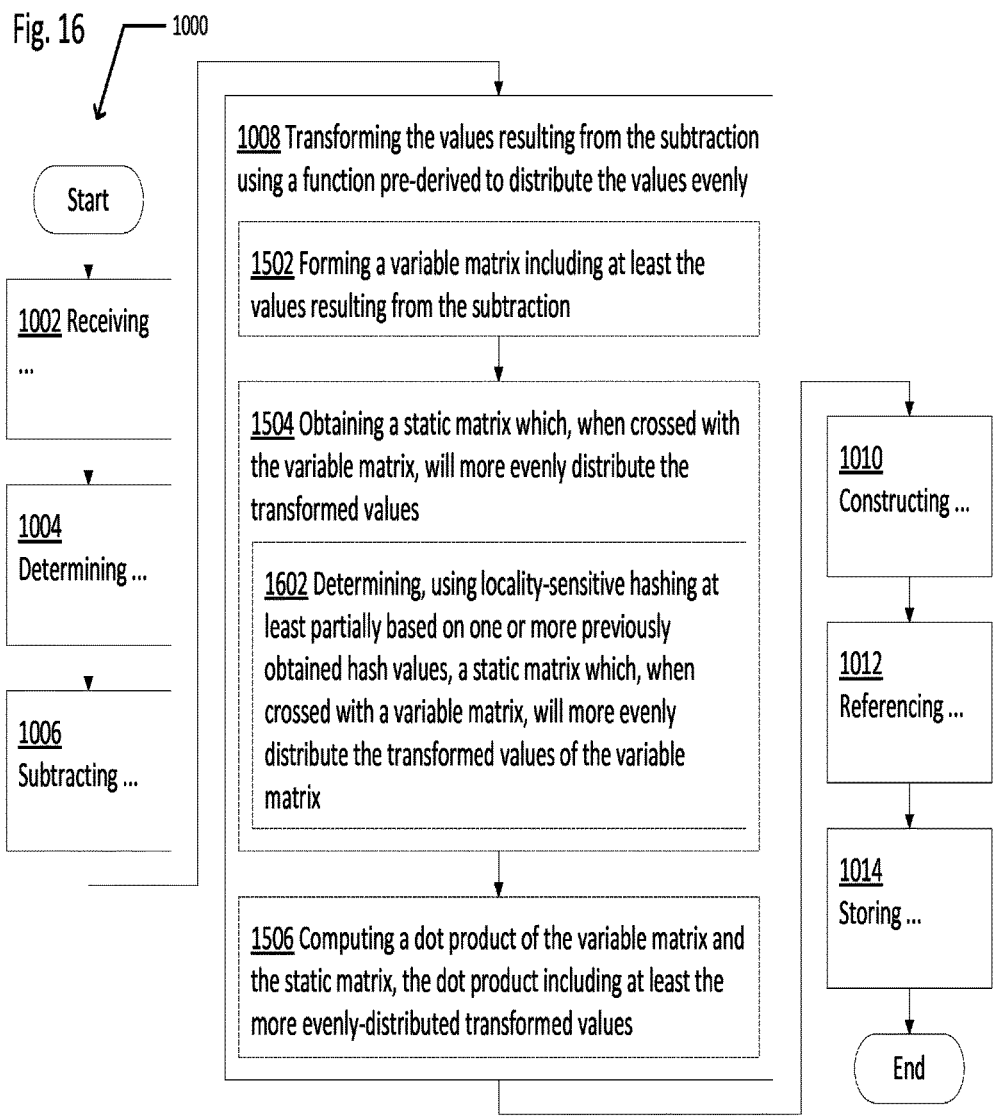

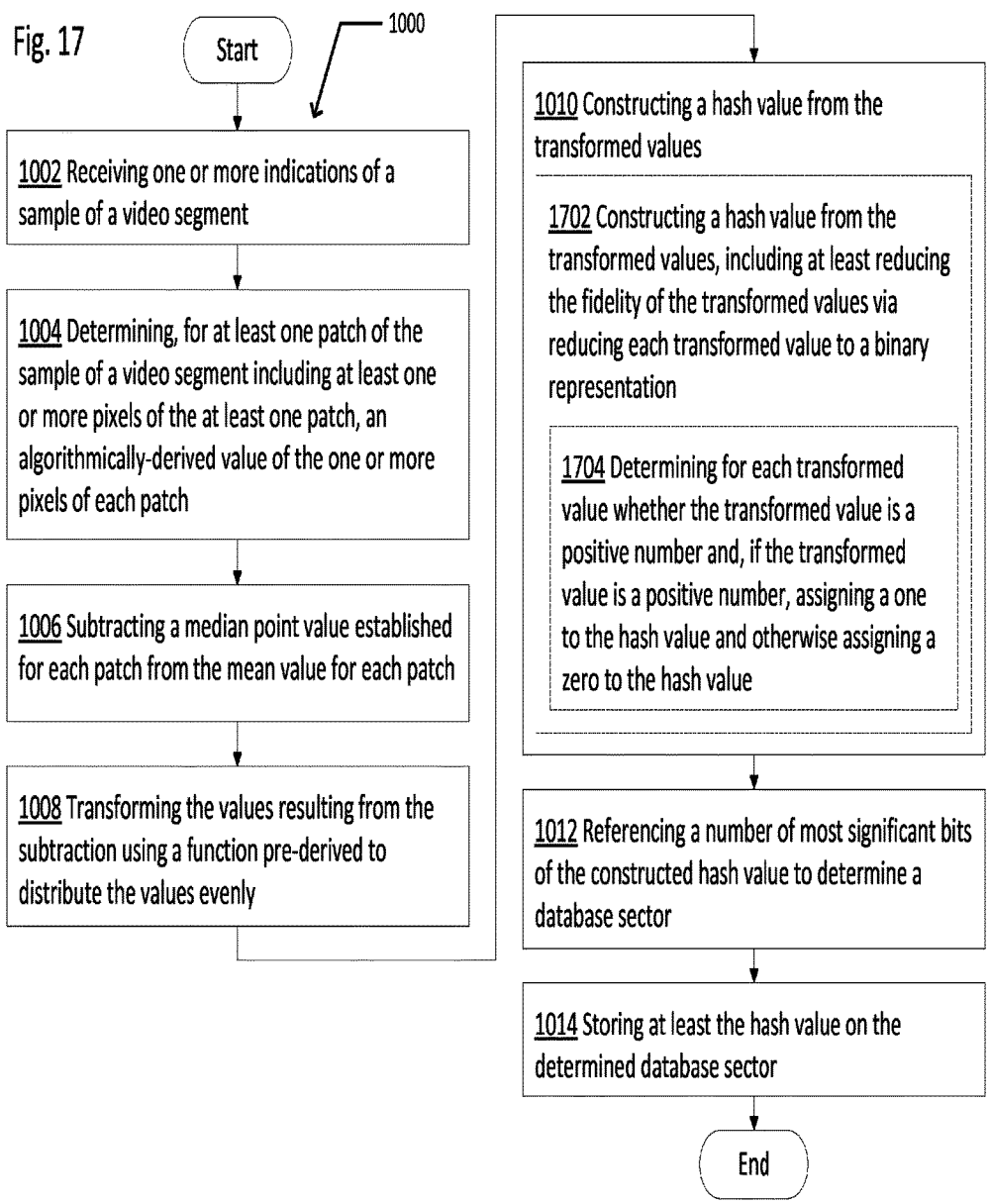

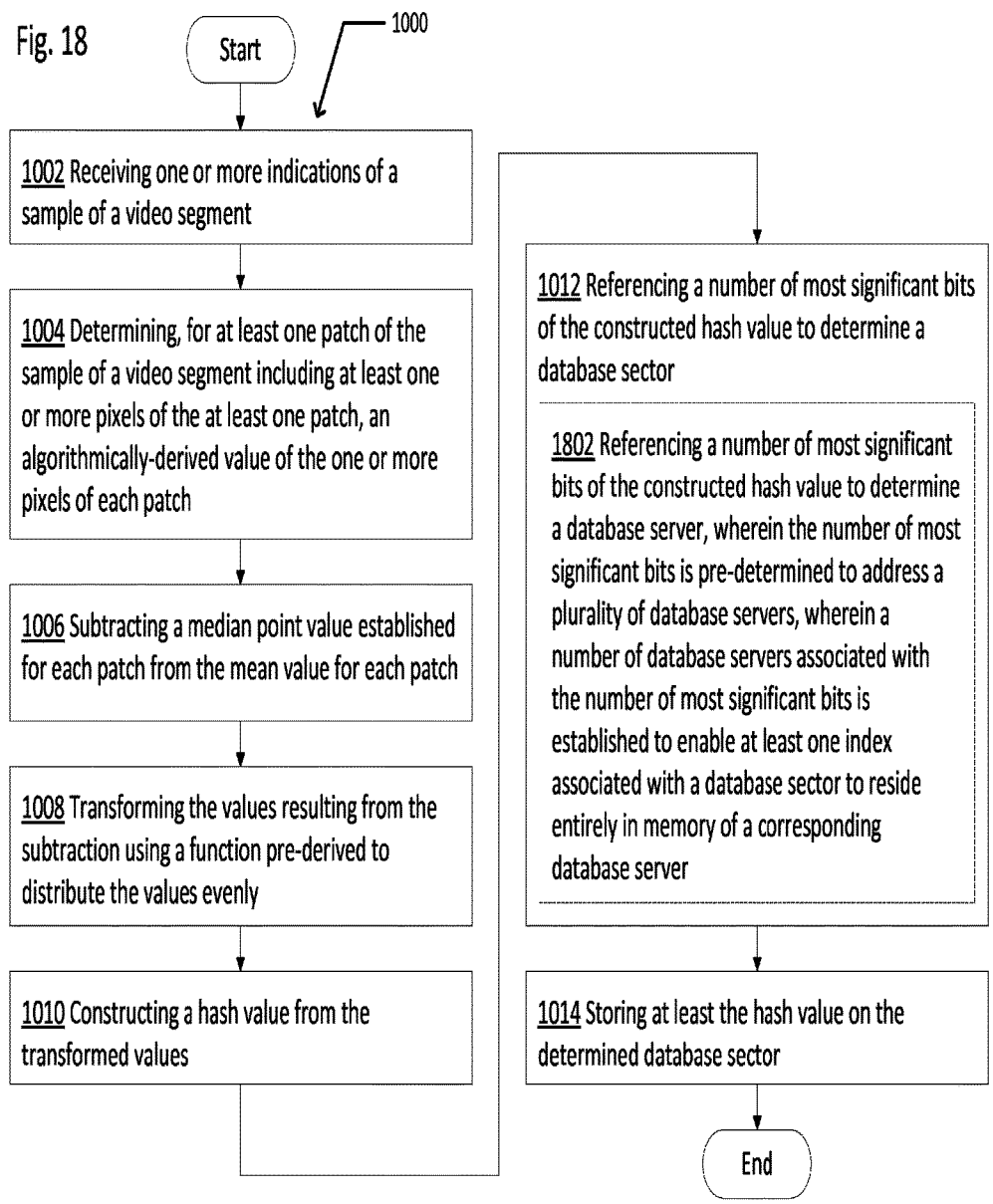

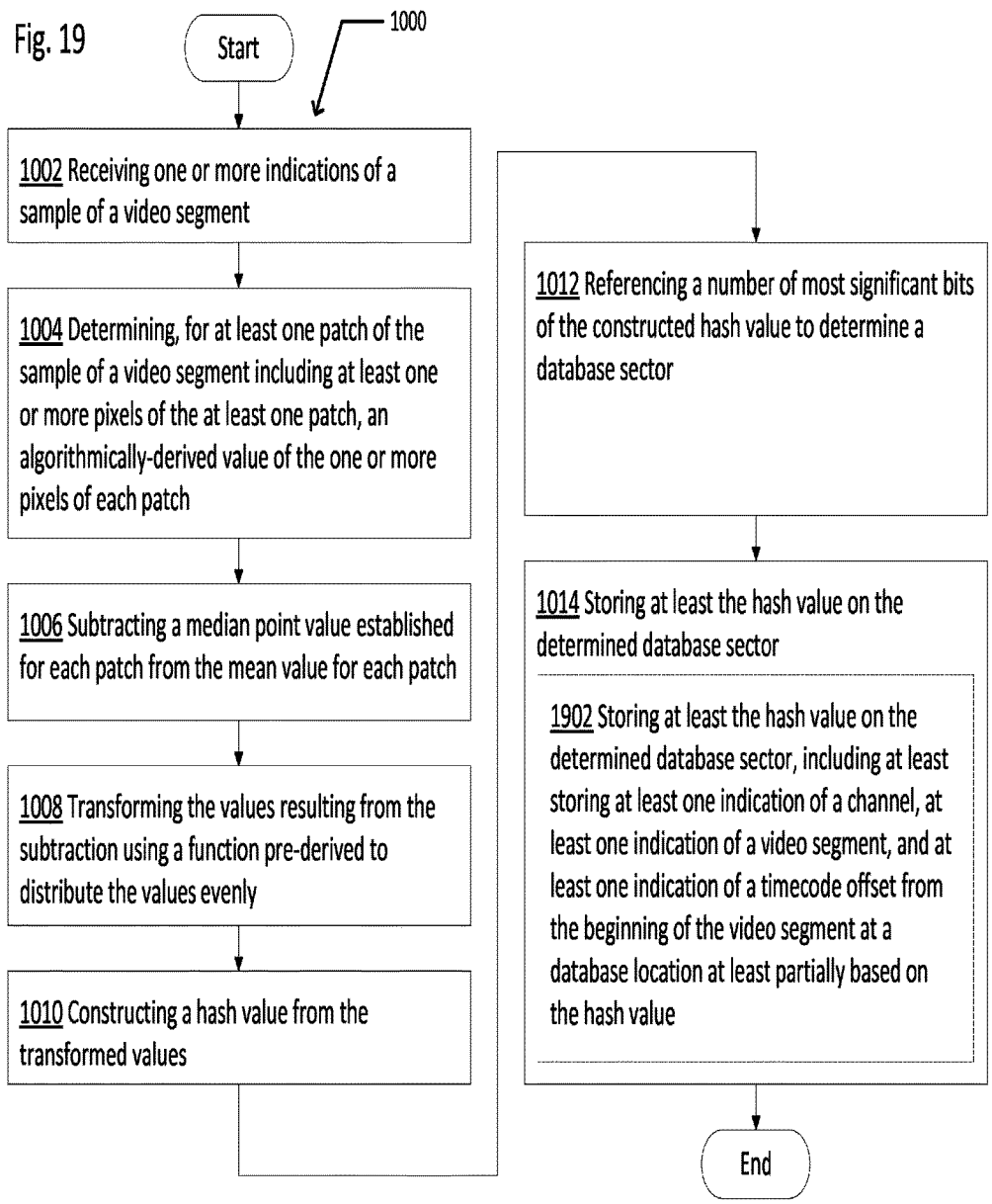

Fig. 20

```
        Start
          │
          ▼
┌─────────────────────┐
│ 2002 Receiving a cue,│
│ the cue constructed │
│ via one or more     │
│ operations          │
│ associated with a   │
│ media storage       │
│ operation           │
└─────────────────────┘
          │
          ▼
┌─────────────────────┐
│ 2004 Referencing a  │
│ number of most      │
│ significant bits of │
│ the received cue to │
│ determine a database│
│ sector              │
└─────────────────────┘
          │
          ▼
┌─────────────────────┐
│ 2006 Returning at   │
│ least one indication│
│ of at least one     │
│ candidate from the  │
│ database sector     │
│ based at least      │
│ partially on the    │
│ received cue        │
└─────────────────────┘
          │
          ▼
         End
```

Fig. 21

Start
↓

2002 Receiving a cue, the cue constructed via one or more operations associated with a media storage operation

| 2102 Receiving a cue associated with a sample of a video buffer of a client system, including at least receiving one or more indications related to an epoch time associated with the sample of the video buffer of the client system | 2104 Receiving a cue, the cue associated with a sample of a video buffer of a client system, the cue at least partially determined by hashing at least some values associated with the video buffer | 2106 Receiving a cue, the cue associated with a sample of a video buffer of a client system, the cue at least partially determined by hashing at least some values associated with the video buffer, the hashing based at least partially one or more of at least one operand or at least one algorithm also utilized in an associated media storage operation |

↓

2004 Referencing a number of most significant bits of the received cue to determine a database sector

↓

2006 Returning at least one indication of at least one candidate from the database sector based at least partially on the received cue

↓

End

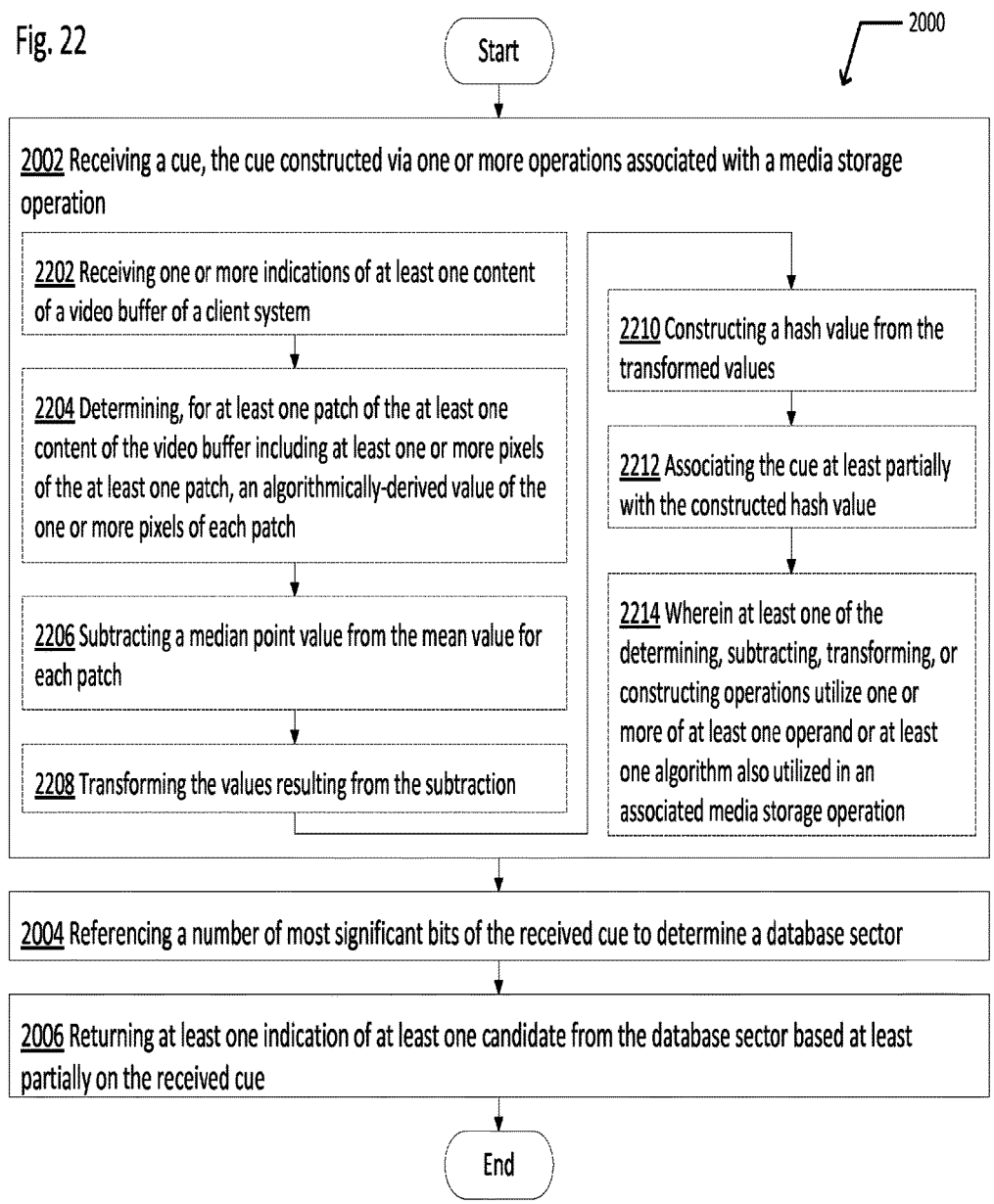

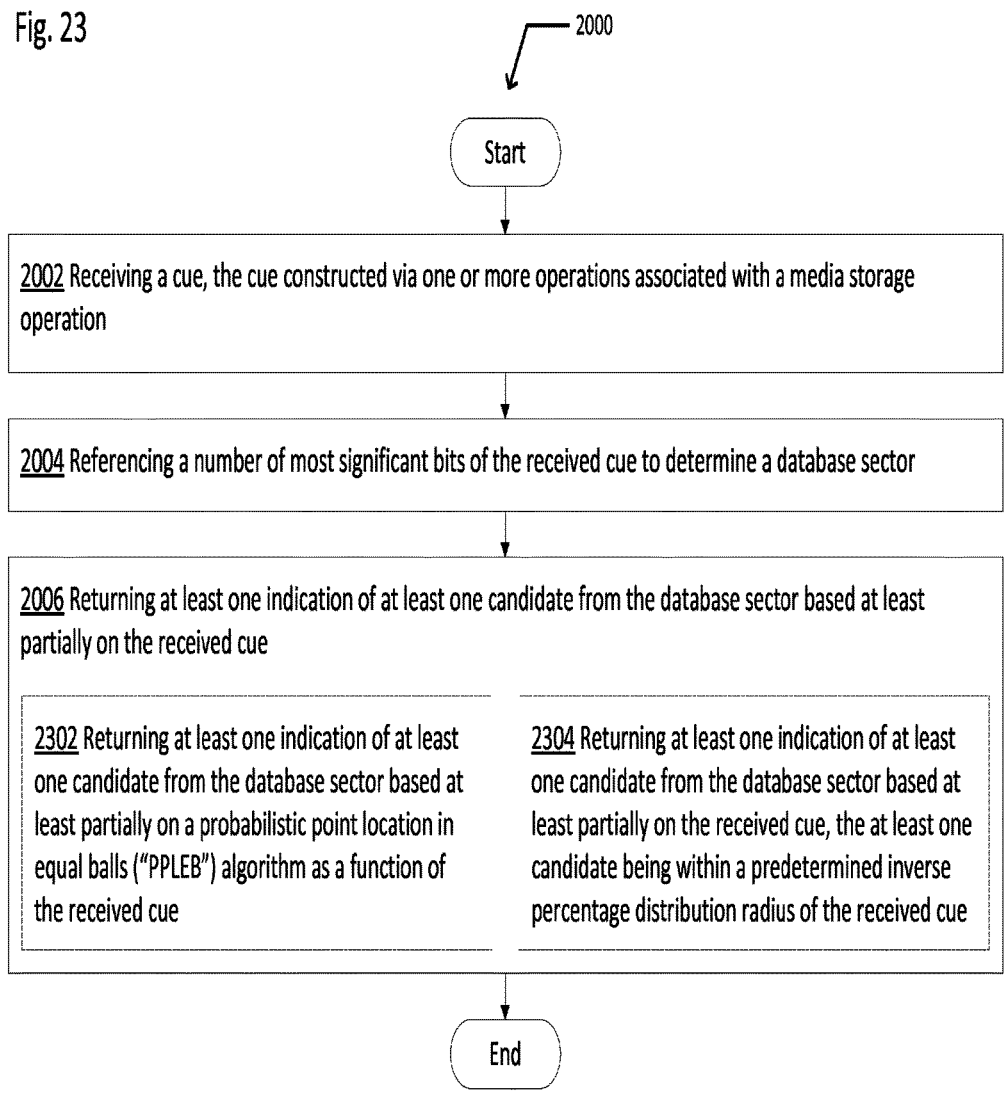

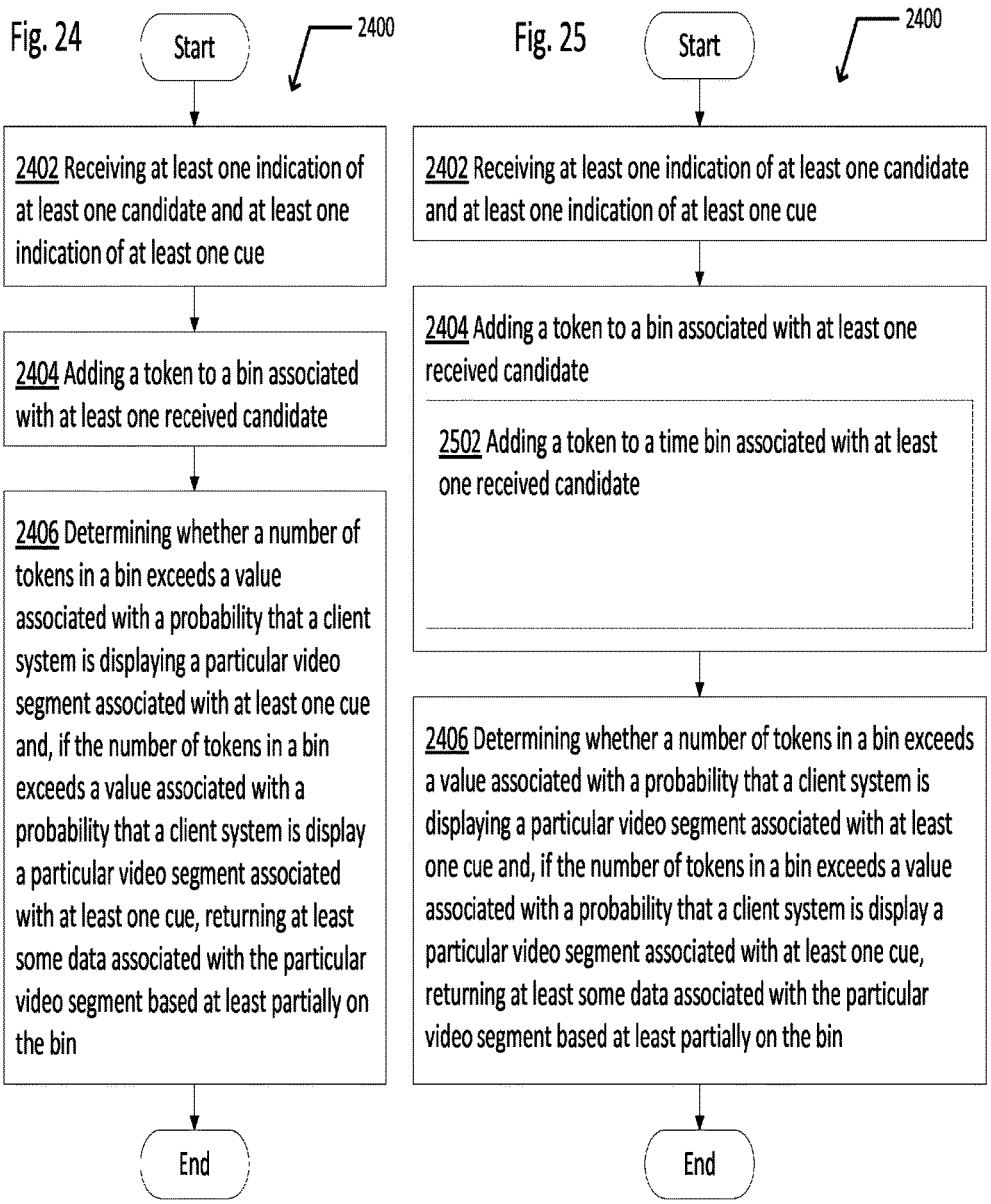

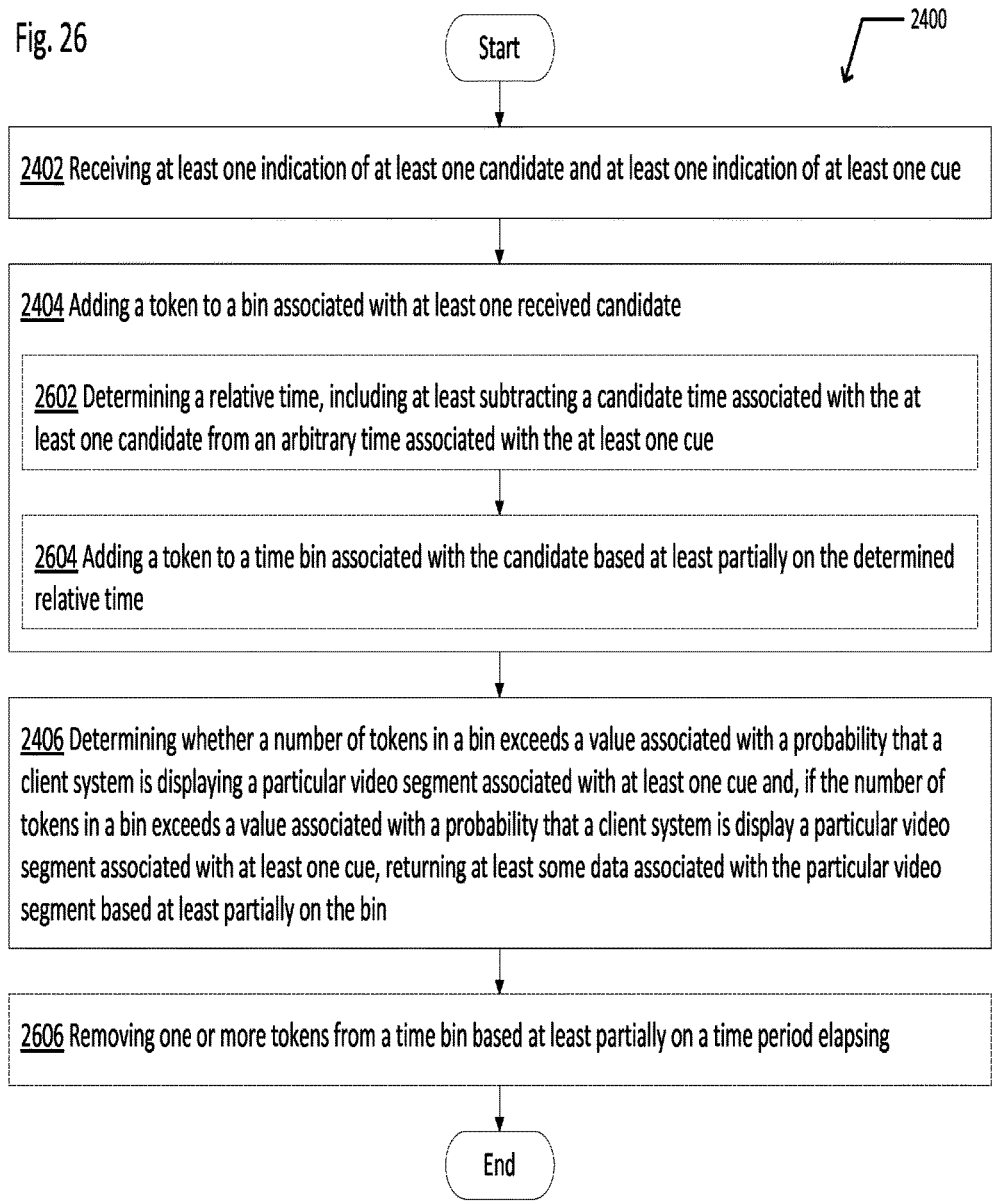

Fig. 27

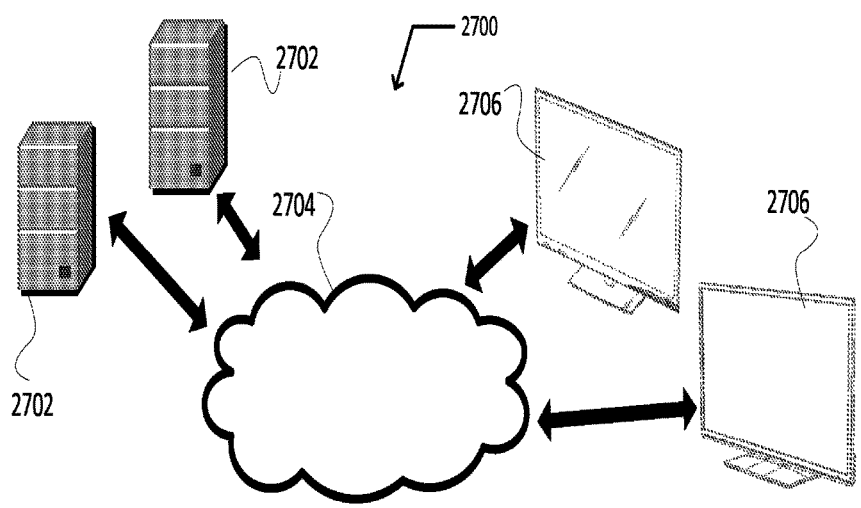

2708 At least one non-transitory computer-readable medium

2710 Computer-executable instructions operable to:
    (a)    receive one or more indications associated with at least one video buffer of at least one client system
    (b)    determine a cue based at least partially on the at least one video buffer and at least one epoch time associated with the at least one video buffer, wherein one or more of at least one operand or at least one function associated with determining the cue is also utilized in an associated media storage operation
    (c)    reference a number of most significant bits of a determined cue to determine a database sector, and
    (d)    return at least one indication of at least one candidate from a determined database sector based at least partially on a determined cue

Fig. 28

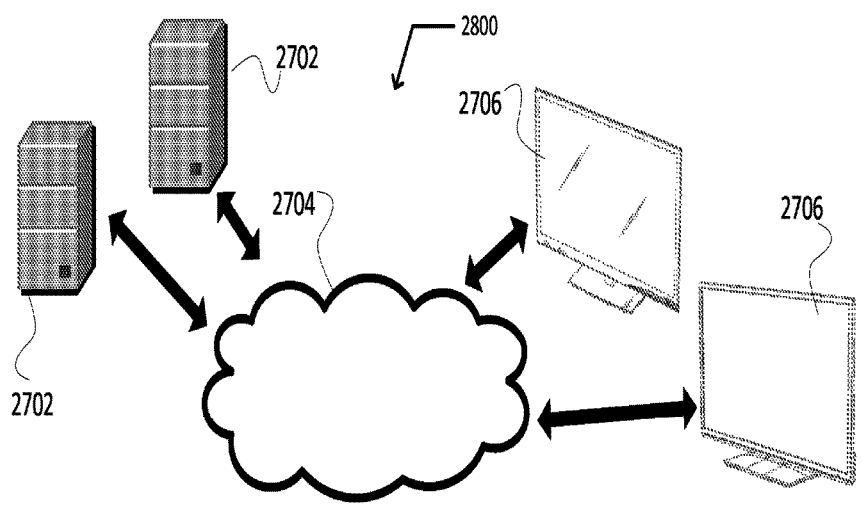

2708 At least one non-transitory computer-readable medium

2810 Computer-executable instructions operable to:
    (a)    receive one or more indications associated with at least one video buffer of at least one client system
    (b)    determine a cue based at least partially on the at least one video buffer and at least one epoch time associated with the at least one video buffer, wherein one or more of at least one operand or at least one function associated with determining the cue is also utilized in an associated media storage operation
    (c)    reference a number of most significant bits of a determined cue to determine a database sector, and
    (d)    return at least one indication of at least one candidate from a determined database sector based at least partially on a determined cue

Fig. 29

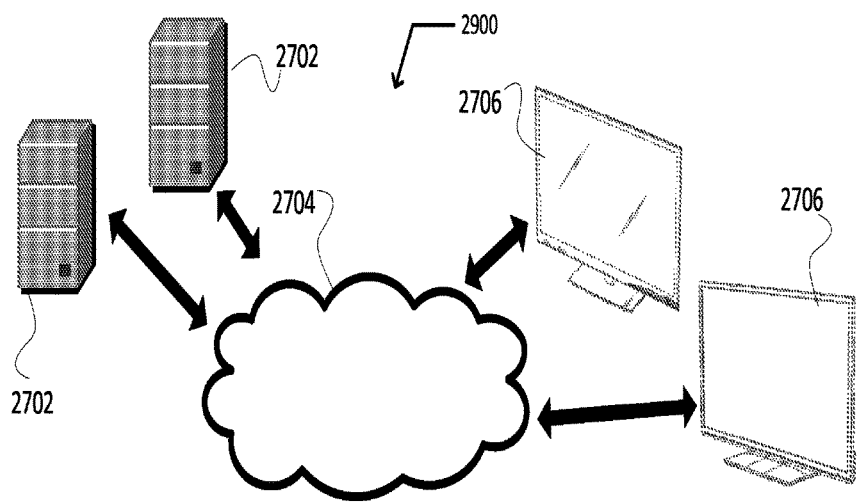

2708 At least one non-transitory computer-readable medium

2910 Computer-executable instructions operable to:
    (a)    receive at least one indication of at least one candidate and at least one indication of at least one cue
    (b)    add a token to a bin associated with at least one received candidate, and
    (c)    determine whether a number of tokens in a bin exceeds a value associated with a probability that a client system is receiving a particular video segment associated with at least one received cue and, if the number of tokens in a bin exceeds a value associated with a probability that a client system is receiving a particular video segment associated with at least one received cue, returning at least some data associated with the particular video segment based at least partially on the bin

SYSTEMS AND METHODS FOR ADDRESSING A MEDIA DATABASE USING DISTANCE ASSOCIATIVE HASHING

CROSS-REFERENCES TO RELATED APPLICATIONS

This application is a continuation of U.S. patent application Ser. No. 14/678,856, filed on Apr. 3, 2015, which is a continuation-in-part of Ser. No. 12/788,721, filed on May 27, 2010, now U.S. Pat. No. 8,595,781, and a continuation-in-part of U.S. patent application Ser. No. 12/788,748, filed on May 27, 2010, now U.S. Pat. No. 8,769,584, and a continuation-in-part of U.S. patent application Ser. No. 14/089,003, filed on Nov. 25, 2013, now U.S. Pat. No. 8,898,714, and a continuation-in-part of U.S. patent application Ser. No. 14/217,039, filed on Mar. 17, 2014, now U.S. Pat. No. 9,055,335, and a continuation-in-part of U.S. patent application Ser. No. 14/217,075, filed on Mar. 17, 2014, now U.S. Pat. No. 9,055,309, and a continuation-in-part of U.S. patent application Ser. No. 14/217,094, filed Mar. 17, 2014, now U.S. Pat. No. 8,930,980, and a continuation-in-part of U.S. patent application Ser. No. 14/217,375, filed on Mar. 17, 2014, now U.S. Pat. No. 9,094,714, and a continuation-in-part of U.S. patent application Ser. No. 14/217,425, filed on Mar. 17, 2014, now U.S. Pat. No. 9,071,868, and a continuation-in-part of U.S. patent application Ser. No. 14/217,435, filed on Mar. 17, 2014, now U.S. Pat. No. 9,094,715, and a continuation-in-part of U.S. patent application Ser. No. 14/551,933, filed on Nov. 24, 2014. U.S. patent application Ser. No. 12/788,721 claims the benefit of and priority to U.S. Provisional Application No. 61/182,334 filed on May 29, 2009 and U.S. Provisional Application No. 61/290,714 filed on Dec. 29, 2009. U.S. patent application Ser. No. 14/217,039 claims the benefit of and priority to U.S. Provisional Application No. 61/791,578 filed on Mar. 15, 2013. All of these applications are hereby incorporated by reference in their entireties for all purposes.

FIELD OF THE INVENTION

This invention generally relates to the matching of unknown media data, such as video or audio segments, against a massive database of reference media files.

BACKGROUND

Systems for automatic content recognition (ACR) of audio or video media are well known to persons skilled in the art. However, such ACR systems pose many technical challenges, including managing potentially very large databases of encoded audio or video information as well as managing large indices needed for addressing information in said databases.

Also well known to those skilled in the art, is that large database indices such as may be used by this invention, can be generated using certain hashing functions. Another method of addressing a database might be by applying binary tree structures also known as b-trees. Both methods are commonly utilized in data management systems.

Whatever the method employed to index a large database, said index is often too large to reside in its entirety in the main memory of a computer server as used in a typical ACR system. When said database cannot fit entirely in the memory of a computer system, it is typically stored on magnetic disk storage and parts of said database are then read into memory in blocks corresponding to the index value providing the address. Said means of recalling partial database information is also known to one skilled in the art as "paging" which is a process common to many different computer software systems.

The present invention is an extension of the invention referenced above and is a system and method for matching unknown digital media such as television programming to a database of known media using a signal processing means employing a modified path pursuit algorithm, as described in the first invention.

Another novel aspect of the system and method as disclosed herein is its distance associative hash indexing means which can be subdivided into a plurality of independently addressable segments where each of said segments can address a portion of the database each of which can reside in its entirety in the main memory of a server means. The resulting cluster of servers of the indexing means each hosts a sector of the index addressing associated data of a larger database of searchable audio or video information. This indexing means of the invention results in a significant improvement in the speed and accuracy of the ACR system so enabled as to identify unknown media even when the television display is showing content where a user is changing channels, rewinding, fast-forwarding or even pausing video from a digital video recorder.

SUMMARY

In some embodiments, an exemplary method related to addressing a media database using distance associative hashing may include receiving one or more indications of a sample of a video segment; determining, for at least one patch of the sample of a video segment including at least one or more pixels of the at least one patch, an algorithmically-derived value of the one or more pixels of each patch; subtracting a median point value established for each patch from the mean value for each patch; transforming the values resulting from the subtraction using a function pre-derived to distribute the values evenly; constructing a hash value from the transformed values; referencing a number of most significant bits of the constructed hash value to determine a database sector; and storing at least the hash value on the determined database sector.

In some embodiments, at least one of the receiving, determining, subtracting, transforming, constructing, referencing, or storing of the foregoing exemplary method is at least partially implemented using one or more processing devices. In some embodiments of the foregoing exemplary method, receiving one or more indications of a sample of a video segment may include receiving one or more indications of at least one of a frame or a still image. In some embodiments of the foregoing exemplary method, receiving one or more indications of a sample of a video segment may include receiving one or more indications of a sample of a video segment, the one or more indications of a sample of a video segment associated with at least one indication of a channel, at least one indication of a video segment, and at least one indication of a timecode offset from the beginning of the video segment.

In some embodiments of the foregoing exemplary method, determining, for at least one patch of the sample of a video segment including at least one or more pixels of the at least one patch, an algorithmically-derived value of the one or more pixels of each patch includes at least determining, for at least one patch of the sample of a video segment including at least one or more pixels of the at least one patch, a mean value of the one or more pixels of each patch. In some embodiments of the foregoing exemplary method, subtracting a median point value established for each patch from the mean value for each patch may include subtracting a median point value established for each patch from the mean value for each patch, the median point value established for each patch having been previously determined utilizing data from each patch for a plurality of channels over at least one period of time.

In some embodiments of the foregoing exemplary method, transforming the values resulting from the subtraction using a function pre-derived to distribute the values evenly may include forming a variable matrix including at least the values resulting from the subtraction; obtaining a static matrix which, when crossed with the variable matrix, will more evenly distribute the transformed values; and computing a dot product of the variable matrix and the static matrix, the dot product including at least the more evenly-distributed transformed values. In some embodiments of the foregoing exemplary method, obtaining a static matrix which, when crossed with the variable matrix, will more evenly distribute the transformed values may include determining, using locality-sensitive hashing at least partially based on one or more previously obtained hash values, a static matrix which, when crossed with a variable matrix, will more evenly distribute the transformed values of the variable matrix.

In some embodiments of the foregoing exemplary method, constructing a hash value from the transformed values may include constructing a hash value from the transformed values, including at least reducing the fidelity of the transformed values via reducing each transformed value to a binary representation. In some embodiments of the foregoing exemplary method, reducing the fidelity of the transformed values via reducing each transformed value to a binary representation may include determining for each transformed value whether the transformed value is a positive number and, if the transformed value is a positive number, assigning a one to the hash value and otherwise assigning a zero to the hash value.

In some embodiments of the foregoing exemplary method, referencing a number of most significant bits of the constructed hash value to determine a database sector may include referencing a number of most significant bits of the constructed hash value to determine a database server, wherein the number of most significant bits is pre-determined to address a plurality of database servers, wherein a number of database servers associated with the number of most significant bits is established to enable at least one index associated with a database sector to reside entirely in memory of a corresponding database server. In some embodiments of the foregoing exemplary method, storing at least the hash value on the determined database sector may include storing at least the hash value on the determined database sector, including at least storing at least one indication of a channel, at least one indication of a video segment, and at least one indication of a timecode offset from the beginning of the video segment at a database location at least partially based on the hash value.

In one or more alternative embodiments of the foregoing exemplary method, related systems include but are not limited to circuitry and/or programming for effecting the herein-referenced method embodiments; the circuitry and/or programming can be virtually any combination of hardware, software, and/or firmware configured to effect the herein-referenced method aspects depending upon the design choices of the system designer.

In a different embodiment, an exemplary method related to addressing a media database using distance associative hashing may include receiving a cue, the cue constructed via one or more operations associated with a media storage operation; referencing a number of most significant bits of the received cue to determine a database sector; and returning at least one indication of at least one candidate from the database sector based at least partially on the received cue.

In some embodiments of the foregoing exemplary method, receiving a cue, the cue constructed via one or more operations associated with a media storage operation may include receiving a cue associated with a sample of a video buffer of a client system, including at least receiving one or more indications related to an epoch time associated with the sample of the video buffer of the client system. In some embodiments of the foregoing exemplary method, receiving a cue, the cue constructed via one or more operations associated with a media storage operation may include receiving a cue, the cue associated with a sample of a video buffer of a client system, the cue at least partially determined by hashing at least some values associated with the video buffer.

In some embodiments of the foregoing exemplary method, receiving a cue, the cue associated with a sample of a video buffer of a client system, the cue at least partially determined by hashing at least some values associated with the video buffer may include receiving a cue, the cue associated with a sample of a video buffer of a client system, the cue at least partially determined by hashing at least some values associated with the video buffer, the hashing based at least partially one or more of at least one operand or at least one algorithm also utilized in an associated media storage operation. In some embodiments of the foregoing exemplary method, receiving a cue, the cue constructed via one or more operations associated with a media storage operation may include receiving a cue, the cue determined via one or more operations including at least receiving one or more indications of at least one content of a video buffer of a client system; determining, for at least one patch of the at least one content of the video buffer including at least one or more pixels of the at least one patch, an algorithmically-derived value of the one or more pixels of each patch; subtracting a median point value from the mean value for each patch; transforming the values resulting from the subtraction; constructing a hash value from the transformed values; and associating the cue at least partially with the constructed hash value, wherein at least one of the determining, subtracting, transforming, or constructing operations utilize one or more of at least one operand or at least one algorithm also utilized in an associated media storage operation.

In some embodiments of the foregoing exemplary method, returning at least one indication of at least one candidate from the database sector based at least partially on the received cue may include returning at least one indication of at least one candidate from the database sector based at least partially on a probabilistic point location in equal balls ("PPLEB") algorithm as a function of the received cue. In some embodiments of the foregoing exemplary method, returning at least one indication of at least one candidate from the database sector based at least partially on the received cue may include returning at least one indication of at least one candidate from the database sector based at least partially on the received cue, the at least one candidate being within a predetermined inverse percentage distribution radius of the received cue.

In one or more alternative embodiments of the foregoing exemplary method, related systems include but are not limited to circuitry and/or programming for effecting the herein-referenced method embodiments; the circuitry and/or programming can be virtually any combination of hardware, software, and/or firmware configured to effect the herein-referenced method aspects depending upon the design choices of the system designer.

In a different embodiment, an exemplary method related to addressing a media database using distance associative hashing may include receiving at least one indication of at least one candidate and at least one indication of at least one cue; adding a token to a bin associated with at least one received candidate; and determining whether a number of tokens in a bin exceeds a value associated with a probability that a client system is displaying a particular video segment associated with at least one cue and, if the number of tokens in a bin exceeds a value associated with a probability that a client system is display a particular video segment associated with at least one cue, returning at least some data associated with the particular video segment based at least partially on the bin.

In some embodiments of the foregoing exemplary method, adding a token to a bin associated with at least one received candidate may include adding a token to a time bin associated with at least one received candidate. In some embodiments of the foregoing exemplary method, adding a token to a bin associated with at least one received candidate may include determining a relative time, including at least subtracting a candidate time associated with the at least one candidate from an arbitrary time associated with the at least one cue; and adding a token to a time bin associated with the candidate based at least partially on the determined relative time. In some embodiments of the foregoing exemplary method, the method may include removing one or more tokens from a time bin based at least partially on a time period elapsing.

In one or more alternative embodiments of the foregoing exemplary method, related systems include but are not limited to circuitry and/or programming for effecting the herein-referenced method embodiments; the circuitry and/or programming can be virtually any combination of hardware, software, and/or firmware configured to effect the herein-referenced method aspects depending upon the design choices of the system designer.

In a different embodiment, an exemplary system related to addressing a media database using distance associative hashing may include, but is not limited to, one or more computing devices; and one or more instructions that, when executed on at least some of the one or more computing devices, cause at least some of the one or more computing devices to at least receive at least one stream of rasterized video; create at least one hash value associated with at least one sample of at least one received rasterized video stream; determine at least one database sector for storing a created at least one hash value; and store a created at least one hash value on at least one determined database sector.

In a different embodiment, an exemplary system related to addressing a media database using distance associative hashing may include, but is not limited to, one or more computing devices; and one or more instructions that, when executed on at least some of the one or more computing devices, cause at least some of the one or more computing devices to at least receive one or more indications associated with at least one video buffer of at least one client system; determine a cue based at least partially on the at least one video buffer and at least one epoch time associated with the at least one video buffer, wherein one or more of at least one operand or at least one function associated with determining the cue is also utilized in an associated media storage operation; reference a number of most significant bits of a determined cue to determine a database sector; and return at least one indication of at least one candidate from a determined database sector based at least partially on a determined cue.

In a different embodiment, an exemplary system related to addressing a media database using distance associative hashing may include, but is not limited to, one or more computing devices; and one or more instructions that, when executed on at least some of the one or more computing devices, cause at least some of the one or more computing devices to at least receive at least one indication of at least one candidate and at least one indication of at least one cue; add a token to a bin associated with at least one received candidate; and determine whether a number of tokens in a bin exceeds a value associated with a probability that a client system is receiving a particular video segment associated with at least one received cue and, if the number of tokens in a bin exceeds a value associated with a probability that a client system is receiving a particular video segment associated with at least one received cue, returning at least some data associated with the particular video segment based at least partially on the bin.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings:

FIG. 5: illustrates the data structure of bins which hold tokens for scoring candidate values from the matching database. Said bins are "leaky" and tokens expire over time as the search process progresses through time.

FIG. 6: illustrates a typical memory paging scheme as taught by prior art for accessing large databases.

FIG. 9 illustrates the beneficial results of using the median values of a pixel location as part of the process of computing the hash values.

FIG. 9a illustrates the problem of not using a media value when partitioning a multi-dimensional dataset.

FIG. 9b illustrates the benefit of finding a media value of a dataset.

FIG. 10 illustrates an operational flow representing example operations related to addressing a media database using distance associative hashing.

FIG. 11 illustrates an alternative embodiment of the operational flow of FIG. 10.

FIG. 12 illustrates an alternative embodiment of the operational flow of FIG. 10.

FIG. 13 illustrates an alternative embodiment of the operational flow of FIG. 10.

FIG. 14 illustrates an alternative embodiment of the operational flow of FIG. 10.

FIG. 15 illustrates an alternative embodiment of the operational flow of FIG. 10.

FIG. 16 illustrates an alternative embodiment of the operational flow of FIG. 10.

FIG. 17 illustrates an alternative embodiment of the operational flow of FIG. 10.

FIG. 18 illustrates an alternative embodiment of the operational flow of FIG. 10.

FIG. 19 illustrates an alternative embodiment of the operational flow of FIG. 10.

FIG. 20 illustrates a different operational flow representing example operations related to addressing a media database using distance associative hashing.

FIG. 21 illustrates an alternative embodiment of the operational flow of FIG. 20.

FIG. 22 illustrates an alternative embodiment of the operational flow of FIG. 20.

FIG. 23 illustrates an alternative embodiment of the operational flow of FIG. 20.

FIG. 24 illustrates another operational flow representing example operations related to addressing a media database using distance associative hashing.

FIG. 25 illustrates an alternative embodiment of the operational flow of FIG. 24.

FIG. 26 illustrates an alternative embodiment of the operational flow of FIG. 24.

FIG. 27 illustrates a system related to addressing a media database using distance associative hashing.

FIG. 28 illustrates another system related to addressing a media database using distance associative hashing.

FIG. 29 illustrates yet another system related to addressing a media database using distance associative hashing.

DETAILED DESCRIPTION

The first invention which relates to this invention is a system and method of matching unknown video to a database of known video using a novel signal processing means employing a modified path pursuit algorithm, among other means, as described in the aforementioned publication.

A novel means of the new invention is its Distance Associated Hashing with its attendant provision of utilizing a sectored-index database access. Said indexing means provides a highly computationally-efficient means for matching an unknown media segment to a reference database of known media, such as audio or video content.

This indexing means of the invention results in a significant improvement in the speed and accuracy of the ACR system so enabled as to track the identity of media even when the television display is showing content where a user is changing channels, rewinding, fast-forwarding or even pausing video from a digital video recorder.

Both the building, updating, and the subsequent accessing of the media matching database will describe a system capable of generating and addressing a sectored database such that the database sectors can each reside in the main memory of a respective multiplicity of server means without resorting to a paging means within each of the respective server means. This collective means of addressing a sectored database through locality sensitive hashing provides a significant improvement in efficiency of operation.

Figure 1:
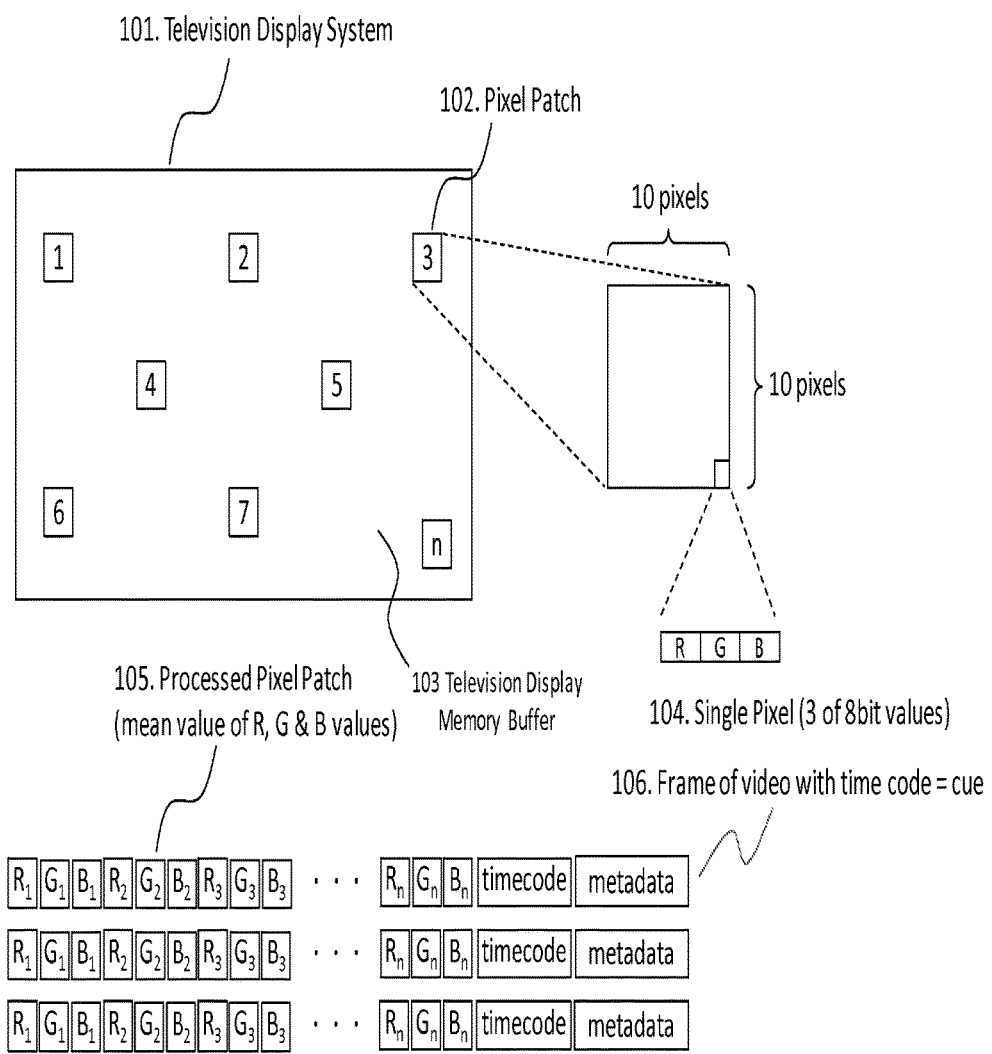
FIG. 1 illustrates the construction of a sectored video matching database as taught by this invention which begins with initial video ingest or capture process which is then continuously updated. A television display system 101 and its corresponding television display memory buffer 103 are shown for a potential embodiment of the system. The allocation of pixel patches 102 and a calculation of a value 105, using certain algorithmic means known to those skilled in the art, is made for each pixel patch and a resulting data structure is created and then time-stamped make a "cue" 106 which may also have additional metadata associated with it.

The construction of a sectored video matching database begins with the process as illustrated in FIG. 1. A television system 101 decodes a television signal and places the contents of each frame of video into a video frame buffer in preparation for the display or further processing of pixel information of the frame of video. Said television system can be any television decoding system that can decode a television signal whether from a baseband or modulated television source and fill a video frame buffer with the decoded RGB values at the respective frame size as specified by the video signal. Such systems are well known to one skilled in the art.

The system of the invention first builds and then continuously updates a reference database of television programming fingerprints described in the original application as cues or cue values. For purposes of building said reference database of video cues, the invention performs the acquisition of one or more patches of video 102 which are read from the video frame buffer 103. Said video patches can be any arbitrary shape or pattern but for the purposes of this example shall be 10 pixels horizontally by 10 pixels vertically. Also for the sake of this example, assume that there are 25 pixel patch positions within the video frame buffer that are evenly distributed within the boundaries of said buffer, though they do not have to be evenly distributed. Each pixel shall consist of a red, a green and a blue value, 104, typically represented by an eight bit binary value for each color for a total of 24 bits or three bytes per patch location.

This composite data structure is populated with the average pixel values from a number of pixel patch positions from the video buffer. A pixel patch is defined as a typically square pixel area of the video buffer with dimensions of perhaps ten pixels by ten rows of pixels 304. The number of pixel patch positions might typically be between ten and fifty locations within the video buffer.

The average pixel values 305 are assembled with a time code 306 referencing the "epoch time" from the processor means of the television system. Epoch time is defined as the time in fractions of a second that have elapsed since midnight, Jan. 1, 1970 which is an accepted convention in computing systems, particularly with Unix (or Linux)-based systems.

In addition, metadata may be included and together a data structure 106 is defined called a tagged fingerprint, "cue", or a "point", as taught in the original patent application. Such metadata attributes might be derived from closed-captioning data from the currently displaying video program or it could be keywords extracted by means of a speech recognition system operating within the processor means of the television system which converts audio from the respective television program into text information. Said textual information may then be searched for relevant key words or sent in its entirety as part of the cue data structure to the central server means for further processing.

Figure 2:
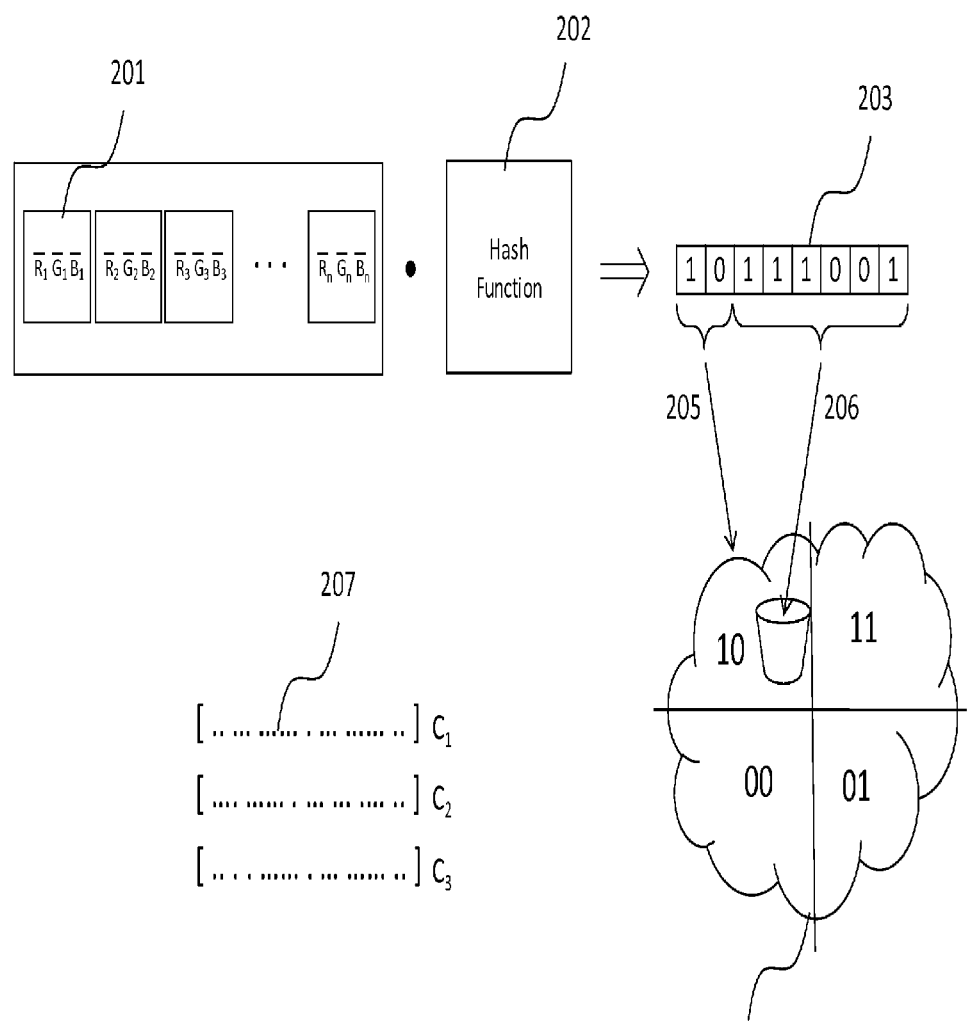
FIG. 2 illustrates the processing of the cue data 201 and the generation of the hash index 202 using the distance associative hashing process, further illustrating the sectored addressing scheme 203 to store data in related groups (buckets) 206.

The cue records 201 are passed in FIG. 2 to a hash function 202 that generates a hash value 203 using a locality sensitive hashing algorithm based on Probabilistic Point Location in Equal Balls algorithm (PPLEB). This hash value is computed from the averaged pixel values from the cue record (fingerprint) 207 and the process associates 206 data with like values into groups called buckets.

The ten by ten pixel patch 302 shown in this particular example would have one hundred pixels and is mathematically averaged resulting in a mean pixel value 305 for red, green and blue values, respectively. Alternatively, any averaging function can be used in place of a simple mean.

A plurality of such pixel patches are extracted from the video frame. If, by way of example, 25 such pixel patches are extracted from the video frame, then the result will be a point representing a position in a 75-dimension space. The skilled person will know that such a large search space could require extensive computing resources to later locate, even approximately, said value in combination with the other 74 values representing one frame of video.

It is an advantage of system and method of distance associated hashing described herein to reduce the computational load and improve accuracy of matching unknown video frames to a known video frame database.

Figure 7:
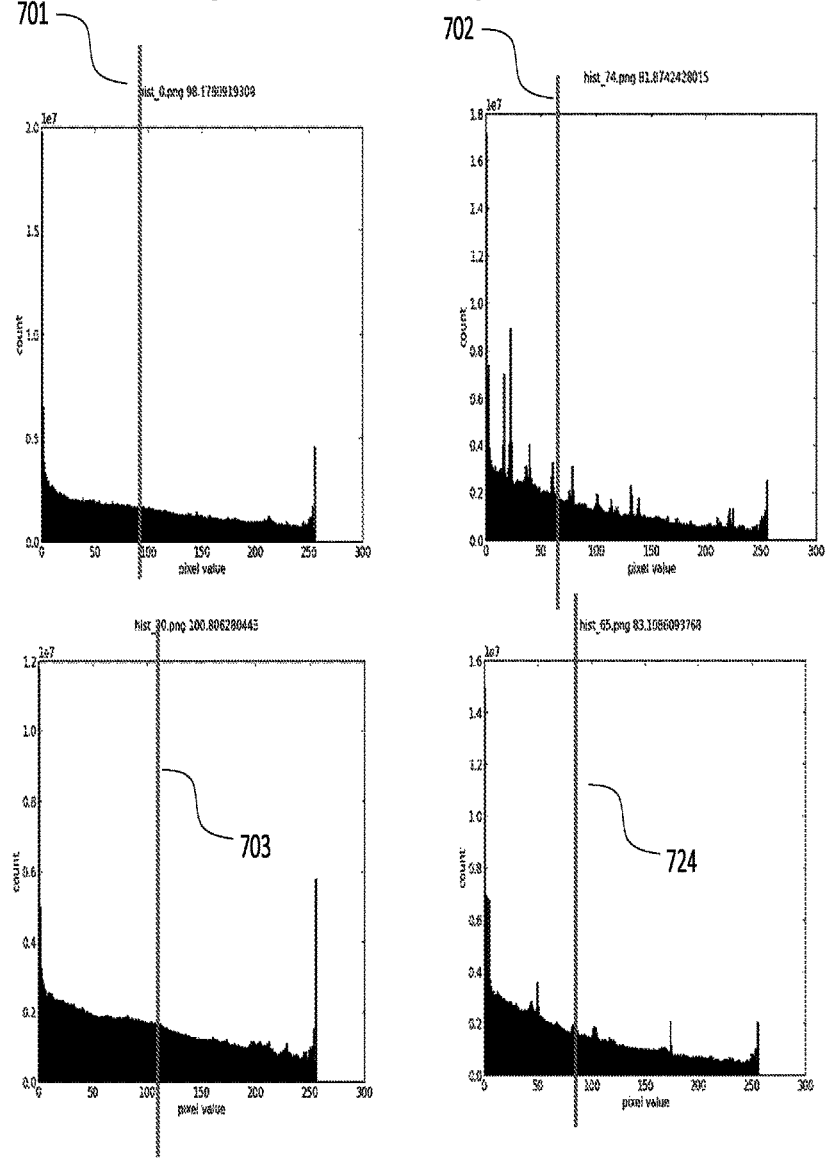
FIG. 7 illustrates the creation of a hash value involving several steps beginning with computing the median value of each of the multiplicity of points which make up the samples from a frame of video.

The creation of the hash value involves several steps beginning with computing an algorithmically-derived value of each point as shown in FIGS. 7, 701 to 775. One useful means of algorithmically deriving said median value is found by summing each point of every frame of every program stream or channel of video maintained by the matching database over perhaps a 24 hour period. The median of each point is found from the summation process. The next step in deriving the final hash value is to subtract the mean value from the point value of each respective point, row 801 minus row 802 equals row 803. The result is a plus or minus values to which a pre-derived hashing function is applied. Typically, the result of the point values minus the mean values of the respective points, are arranged in a matrix to which a dot-product is calculated using a similar matrix constituting the pre-derived hash value (or key). The result of the dot product of the two matrices is then further transformed to a one or zero value based on the sign of the product matrix element. Typically the skilled person would set positive values to one and negative values to zero.

The resulting hash value points to more or less evenly distributed values across the data storage area. The hash value 203 can be further divided, FIG. 2, such that the 'n' most significant bits 205 addresses one of the 2n (2^n) sectors of the database. The remaining bits 206 address individual 'buckets' of the addressed sector of the database, which will be described in more detail later.

The division point of the hash value that defines the individual sector address space is calculated such that the data of the database sector's index fits within the memory confines of the processor systems of said memory sector. Otherwise, said database would be subject to paging which would diminish the effectiveness of this process.

To contrast the system and method taught by the present invention with that which is known to those skilled in the relevant prior art, FIG. 6 illustrates a typical paging approach. In FIG. 6, assume the example system is attempting to match unknown data to a database of known data. An index 602 is used to address only the portion of the data 605 that can fit in the main memory of the CPU 606. This data is searched and, if results are negative, then another segment of data is fetched into main memory 603 and searching continues.

Such accessing means using paging are common but considerably reduce the efficiency of a computer system. In fact, such an approach could not be uses with ACR systems searching large media database as the read/write speed of magnetic hard drives is insufficient to keep up with the task. Many different algorithmic approaches have been developed over the years to address this issue of splitting the search into smaller parts and allocating smaller searches to multiple computer server systems.

A notable example might be the considerable Google search engine. The skilled person knows this system to be one of the largest computer systems built to date. The speed and accuracy of the Google search process is remarkable. However, the Google search means is considerably different and not at all applicable to matching unknown media to a database of known media even if the two databases were the same very large size. This is because the Google search means employs the map-reduce algorithm which is designed for searching large databases of essentially unassociated data. While an advance over paging system, map-reduce is a computationally-intense process which also requires significant data communications bandwidth between the participating computer systems. In contrast, this invention is efficient in the use of processing and communications resources.

In this invention, the distance associative hashing function provides a means to address a database in sectors such that the data of said addressing means fits in the main memory of an individual server means of group of servers. Said grouping is accomplished by grouping the data related by distance in a multi-dimensional array into the same sector using the distance associative hashing step as a means to achieve said grouping. The sector identification for addressing a data element is calculated from the hash index generated from said process by extracting a subset of the total bits of said hash function and using said subset to address the desired sector in which to store data in the reference database.

In this manner, the hash index subset is the address of the sector that contains the distance associated hash values, called buckets in the first invention. The remainder of the hash address is then used to address a bucket of the sector for storing the new data. Alternatively, the sector address can be found by means of re-hashing the first hash value.

This system and method of database addressing by means of multiple hash-indexing steps produces a highly efficient database accessing scheme with significant performance benefits and increased efficiency over traditional methods of database access as described above.

The distance associative hashing provides a means to address a very complex (multi-dimensional) database quickly by finding data that is not an exact match but rather is within a predetermined radius (distance associative) of the value sought. Importantly, sometimes this addressing means will result in no match at all. Where a business-oriented database cannot tolerate inaccuracy, a media matching system can readily tolerate missed matches and will simply continue the matching process upon the arrival of the next data received and taught in the first patent. Data arrival from the unknown source that is to be determined by the ACR system is periodic, of course, but can be commanded by the system of the invention to arrive at differing intervals based on the requirement for accuracy or by requirements imposed by the state of the system such as when the system might be nearing overload and the sending clients are then commanded to send a lower sample rate. A typical data reception rate might be 1/10 second intervals, for example.

For the reference media database, the group of pixel values are derived from every frame of video from every video source that is to be part of the reference database. The group of pixel values and are then appended with the broadcast time of the video program as well as with certain metadata, which is information about the program such as the content identification (ID), title of the program, actors name, time of airing, short synopsis, etc. Said metadata is generally acquired from commercial electronic program guide sources.

Said array of processed pixel values with the addition of the timecode plus the metadata are then stored in the reference database and the address of said stored data is then added to the hash index at the respective hash value and sector ID value. In addition, a second database index is built and maintained by using the content ID from the metadata as another means for addressing the reference database.

The process of building and continuously updating the database is continuous and the number of days of data maintained by the database is based on the needs of the user but for example might range from one day to one month.

Figure 3:
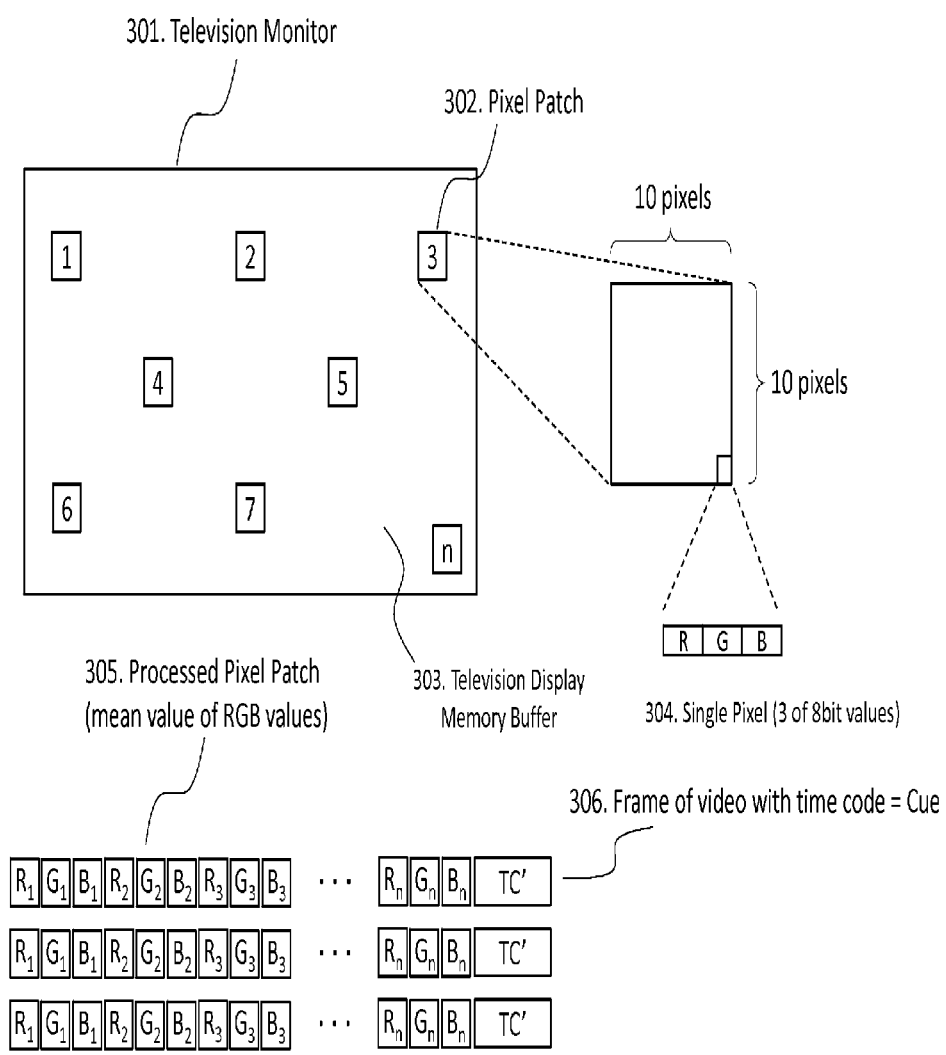
FIG. 3: illustrates the real-time capture of unknown television content for recognition from a connected television monitor or the like 301. A pixel patch is defined as typically a square pixel area of the video buffer 303 with dimensions of perhaps ten pixels by ten rows of pixels 304, however, any reasonable shape and dimension may be used. The number of pixel patch positions can be any number between ten and fifty locations within said video buffer and is processed 305 to send cue data 306 to the central server means.
Figure 4:
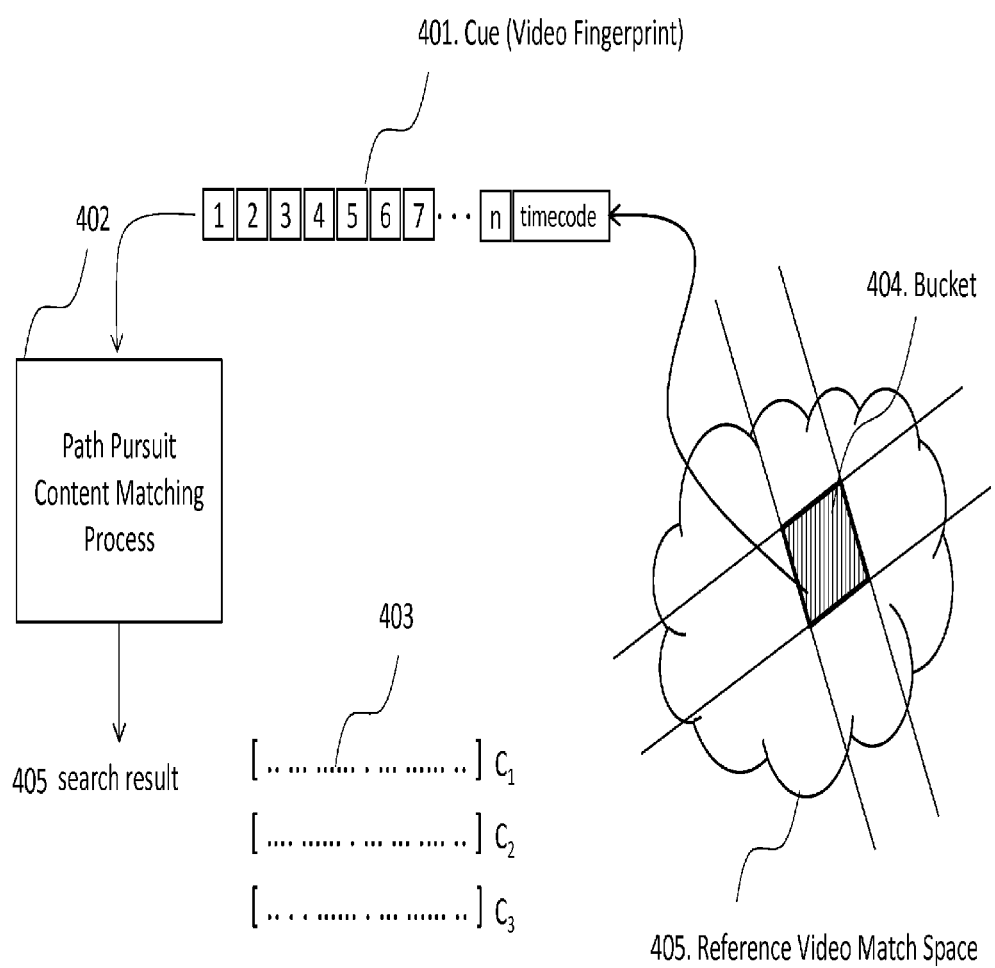
FIG. 4: illustrates the extraction of candidate cue values 401 from the reference (matching) database bucket 404 and supplying said cue values 403 to the path pursuit content matching process 402 as taught in the first invention referenced above.

The process of identifying an unknown video segment from data received from a multiplicity of client devices begins with a procedure similar to that used above for building the reference database. In FIG. 3, this procedure involves a television monitor 301, such as a popular flat-screen HDTV typically of the type known as the smart TV wherein the TV contains a processing means with memory capable of executing application programs similar to the type found on common smartphones of today. The system of the invention samples regions 302 of a video frame buffer 301 in typically a multiplicity of places. Said samples are of an identical size, shape and position to the pixel patches used in the process of building the reference database. Each of the collected pixel patches is then algorithmically processed to produce a computed value for the red, green and blue values of each patch in a manner identical to the method used to create the reference database.

Said system of the invention then calculates a distance associative hash index of the collected mean values identical to the content ingest function described above. The resulting sector identification (ID) value is extracting as a subset of the total bits of the hash index also identically to the ingest system described above. The remainder of the hash index is used to address the desired sector in which to search for all candidate (potential) matches belonging to the same bucket as the unknown data point.

Optionally, if a good guess of a match (a successful match) was available from the process above, the system of the invention will also collect candidates from the database responsible for said sector belonging to the potential content ID, using the content ID index, created during the ingest process as described above, to address reference cues around time radius r' of the timestamp (of the successfully matched candidate). Duplicate candidates are next removed as well as candidates that are too far from the unknown point by radius r, as taught in the first patent.

In order to test for a match of an unknown video segment against a reference database of known video data, assume the list of candidates from the previous step where each candidate (i.e. each possible match) has associated with it the following data items: content ID, media time, inverse percentage distribution radius which is calculated as the distance from the current unknown point (from unknown video stream) where 100% represents the exact value of the unknown point and 0% is a value beyond the radius r (distribution) from the unknown point.

Each matching candidate 501 is assigned a data structure 502 in the memory of the matching system of the invention. The data structure consists of, among other things, arbitrary time bins grouped by some arbitrary amount (e.g. approximately one second). For the sake of example, assume said data structure consists of one hundred bins representing ten seconds of video cue points. The bins are generally not equally spaced in time.

For each candidate found in the reference (match) database: first, a relative time is calculated by subtracting candidate time from the arbitrary time of the unknown video. Candidate time is the time of broadcast of each video cue associated with the candidate during the reference program airing.

The arbitrary time of the unknown video came from the internally generated epoch time of the television monitor from the application of the invention operating in the memory of said television or in a set-top box attached to said television and sent by said application to the central server means of the invention with the sampled video cue points. Epoch time is well known to the skilled person and is typically employed in computer systems. Said time is calculated as the current number of units of time since Jan. 1, 1970.

If, for example, the time difference between the arbitrary time from the television (in the home) and the true media time is 100 seconds, then the relative time of the actually matching candidates should be close to that value. Likewise, candidates that are not a good match are not likely to have relative times close to the 100 seconds of this example.

In the candidate data structure, when a cue point of the unknown video matches a reference cue point, the system of the invention adds a token to the respective bin of the candidate data structure. Said system then repeats the process for the next candidate as described in the previous paragraph.

Another, and important, step for the scoring of results is to apply time discounting to all bins. This is a relatively simple process that decrements the value in all bins by a small amount for each cycle of time. The skilled person would recognize this as a "leaky bucket" method of scoring. By definition, bins that are no longer being filled by means of matching cue points will ultimately decrement to zero over a number of cycles of said process. Also, bins that are filled slowly by random noise in the system will likewise be decremented. Hence, time discounting ultimate clears bins that are filled by false-positive matches and random noise.

The skilled person would also clearly see that without said time discount binning, all bins would eventually fill to capacity and no results could be obtained from the process.

Said time discounting also decrements to zero any bins with levels, such as 503, that are above the matching threshold 504 when the video stream from the client television monitor is in any way changed by any of the following: changing channels, rewind, fast forward, pausing video, etc.

If any bin of the candidate data structure is above a certain threshold 504, such as bin 503, then the content is declared a match. Further means to qualify a match might include testing for contiguous matches of the candidate segment for greater that a determined number of seconds (e.g. three seconds).

Figure 8:
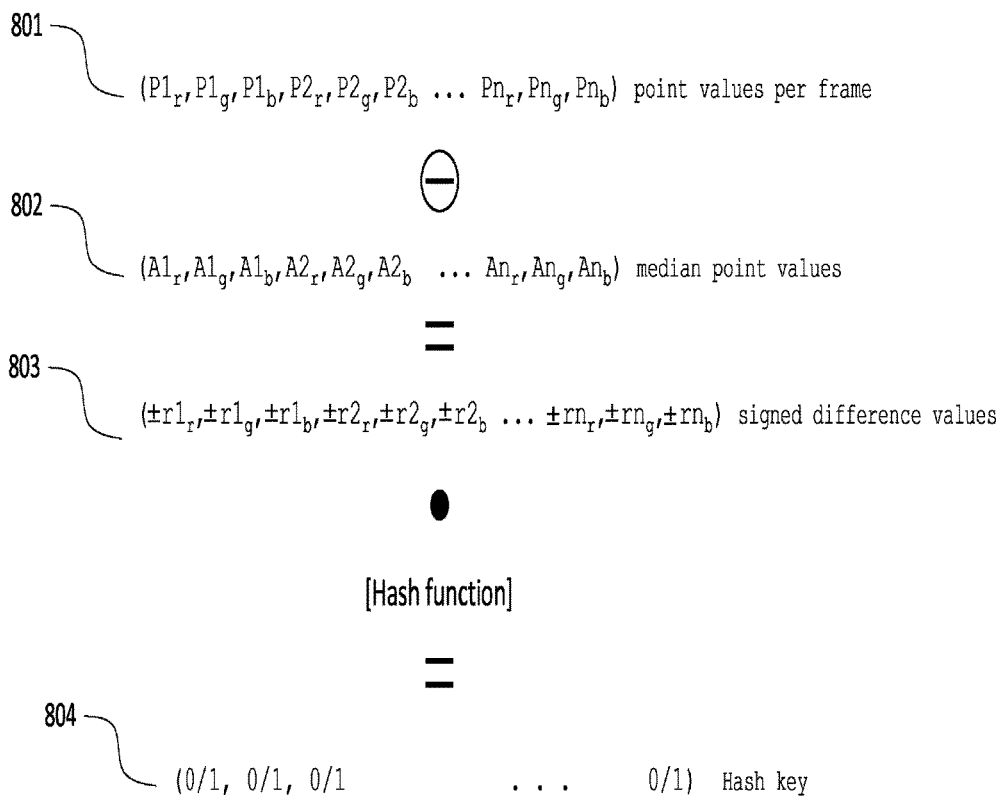
FIG. 8 illustrates how the hash value is computed.

FIG. 8 illustrates how the hash value is computed. First a median value of each pixel location contributing to the video fingerprint is found by summing the values of said location over a period of many days of collection values at said location from a plurality of television channels representative of the typical television programming to be identified by the invention. Once the median value is determined is can be used indefinitely as a constant without further calculation or adjustment. The pixel value sent from the client to the server matching system is first processed by subtracting the median value of said pixel location. The resulting value is stored with the other pixels locations of a video frame in matrix and an appropriate hashing function is applied to said matrix. Hash values are then derived from the resulting dot product.

FIG. 9 illustrates the beneficial results of using the median values of a pixel location as part of the process of computing the hash values. Chart 901 shows the resulting curve of the output of a typical un-optimized hash function with a relatively small number of hash values occupying a relatively narrow range on the left edge of the curve. The resulting median value 902 is relatively low. Chart 903 shows the favorable redistribution of hash values as a resulting of computing the median of each pixel location that participates in the matching process and applying said median value as part of the hashing function. The distribution of hash values is more spread out with an attendant rise in the median value of all hash keys 904.

FIG. 9a illustrates what happens to a dataset when a median value is not found prior to partitioning said dataset. If the system sampled sixteen pixel locations of each video frame and if each pixel location had a red, green and blue pixel value, there would be 64 dimensions (or axis) to the graph. For the sake of illustration, in this example, the dataset includes just two pixel sample points of a single video frame 906 and 908. Further, the example assumes just a single luminance value is obtained at each pixel point. By splitting the dataset diagonally 907 into clockwise sector 907c and counterclockwise sector 907cc and with vertical 908 and horizontal 906 axis crossing at the zero value 905, there are only two of eight sectors 910 and 911 containing data between the two said pixel locations.

FIG. 9b illustrates the benefit of finding the median value of each pixel location. This example continues to use the assumption that the pixel values are a single luminance value from zero to 255, although absolute value is of no consequence to this method. This example illustrates a simplistic assumption of the median value is 128 for both pixel locations. Now, by shifting the point of partition to 905', the vertical and horizontal axis shift to 908' and 906' respectively. Diagonal slice 909 moves to 909'. It is clear from the illustration that now all eight sectors contain data.

When partition a dataset in this manner, the computed median is not necessarily in the middle of the dataset nor does it need to be. The desired result is to spread out the data so that when said data is partitioned and assigned to individual servers, the system accessing said servers more uniformly. In contrast, the unoptimized data of FIG. 9 would have, if partitioned as illustrated among eight servers, seen only two of the eight servers accessed. In the method illustrated by FIG. 9b, with the color values at each pixel location and with an example of 16 pixel locations, the actual computation results in the application of 48 median values computed as a 48 dimension graph. Further, the data can be spliced more than once around each median point of the 48 dimension graph as required to partition said data such that said dataset resulting from said slice can be made to fit within the operational constraints of an individual computer server of the system. In any case, data will be found most of the time on the clockwise and counterclockwise side of each partition slice.

FIG. 10 illustrates an operational flow 1000 representing example operations related to addressing a media database using distance associative hashing. In FIG. 10 and in following figures that include various examples of operational flows, discussion and explanation may be provided with respect to the above-described examples of FIGS. 1 through 9, and/or with respect to other examples and contexts. However, it should be understood that the operational flows may be executed in a number of other environments and contexts, and/or in modified versions of FIGS. 1 through 9. Also, although the various operational flows are presented in the sequence(s) illustrated, it should be understood that the various operations may be performed in other orders than those which are illustrated, or may be performed concurrently.

After a start operation, the operational flow 1000 moves to operation 1002. Operation 1002 depicts receiving one or more indications of a sample of a video segment. For example, as shown in and/or described with respect to FIGS. 1 through 9, the indications may be associated with one or more pixel patches from an ingest system.

Then, operation 1004 depicts determining, for at least one patch of the sample of a video segment including at least one or more pixels of the at least one patch, an algorithmically-derived value of the one or more pixels of each patch. For example, as shown in and/or described with respect to FIGS. 1 through 9, a mean value of the red pixels in each patch, the green pixels in each patch, and the blue pixels in each patch may be computed.

Then, operation 1006 depicts subtracting a median point value established for each patch from the mean value for each patch. For example, as shown in and/or described with respect to FIGS. 1 through 9, a median value of each pixel location contributing to the video fingerprint may be found by summing the values of said location over a period of many days of collection values at said location from a plurality of television channels.

Then, operation 1008 depicts transforming the values resulting from the subtraction using a function pre-derived to distribute the values evenly. For example, as shown in and/or described with respect to FIGS. 1 through 9, the values resulting from the subtraction populate a matrix. A dot product of that matrix and a pre-derived static matrix may be computed. The pre-derived static matrix may be determined prior to operational flow 1000 being instantiated, and may be optimized mathematically based on past ingested data such that matrices crossed with it will produce more evenly distributed results than results coming directly from the subtraction operation.

Then, operation 1010 depicts constructing a hash value from the transformed values. For example, as shown in and/or described with respect to FIGS. 1 through 9, values capable of holding RGB values are reduced to bit form, such that a hash value may be a string of bits.

Then, operation 1012 depicts referencing a number of most significant bits of the constructed hash value to determine a database sector. For example, as shown in and/or described with respect to FIGS. 1 through 9, a number of bits may be predetermined so that the predetermined number of bits of a hash value are used for addressing one or more database sectors.

Then, operation 1014 depicts storing at least the hash value on the determined database sector. For example, as shown in and/or described with respect to FIGS. 1 through 9, the hash value may be stored in a bucket, the bucket including other hash values which are mathematically near, where the hash values are associated at least with particular video segments and offsets.

FIG. 11 illustrates alternative embodiments of the example operational flow 1000 of FIG. 10. FIG. 11 illustrates an example embodiment where operational flow 1000 may include at least one additional operation. Additional operations may include operation 1102.

Operation 1102 illustrates at least one of the receiving 1002, determining 1004, subtracting 1006, transforming 1008, constructing 1010, referencing 1012, or storing 1014 operations being at least partially implemented using one or more processing devices. In some instances, one of the foregoing operations may be at least partially implemented using one or more computer processors. Other processing devices may include Application Specific Integrated Circuits (ASICs), Field Programmable Gate Arrays (FPGAs), digital signal processors (DSPs), or any other circuitry configured to effect the result of at least one of the foregoing operations.

FIG. 12 illustrates alternative embodiments of the example operational flow 1000 of FIG. 10. FIG. 12 illustrates an example embodiment where operation 1002 may include at least one additional operation. Additional operations may include operation 1202, and/or operation 1204.

Operation 1202 illustrates receiving one or more indications of at least one of a frame or a still image. For example, as shown in and/or described with respect to FIGS. 1 through 9, a sample of a video segment may be comprised of an individual frame of a video stream. Such a frame may be one 30 fps video frame. In different embodiments, a sample of a video segment may be a still image, or a portion of a video segment that may be imaged at a rate other than 30 times a second.

Further, operation 1204 illustrates receiving one or more indications of a sample of a video segment, the one or more indications of a sample of a video segment associated with at least one indication of a channel, at least one indication of a video segment, and at least one indication of a timecode offset from the beginning of the video segment. For example, as shown in and/or described with respect to FIGS. 1 through 9, data associated with a video segment (which may be a program title and/or other metadata associated with a video segment), the channel from which the program was ingested, and an offset in time from the start of the program may be received, from, for example, a channel guide associated with a channel which is being monitored by the ingest system.

FIG. 13 illustrates alternative embodiments of the example operational flow 1000 of FIG. 10. FIG. 13 illustrates an example embodiment where operation 1004 may include at least one additional operation 1302.

Operation 1302 illustrates determining, for at least one patch of the sample of a video segment including at least one or more pixels of the at least one patch, a mean value of the one or more pixels of each patch. For example, as shown in and/or described with respect to FIGS. 1 through 9, the algorithmic operation used to reduce the one or more pixels in a patch to a single value may be, for example, an arithmetic mean.

FIG. 14 illustrates alternative embodiments of the example operational flow 1000 of FIG. 10. FIG. 14 illustrates an example embodiment where operation 1006 may include at least one additional operation 1402.

Operation 1402 illustrates subtracting a median point value established for each patch from the mean value for each patch, the median point value established for each patch having been previously determined utilizing data from each patch for a plurality of channels over at least one period of time. For example, as shown in and/or described with respect to FIGS. 1 through 9, a median value may be determined, the median value determined for each patch, wherein medians are established for the same patches at ingest as in the operation of determining a segment on a client system, the median being established as a constant value derived from monitoring the same patches across many channels for a long time (a month, a year, etc.).

FIG. 15 illustrates alternative embodiments of the example operational flow 1000 of FIG. 10. FIG. 15 illustrates an example embodiment where operation 1008 may include at least one additional operation. Additional operations may include operation 1502, operation 1504, and/or operation 1506.

Operation 1502 illustrates forming a variable matrix including at least the values resulting from the subtraction. For example, as shown in and/or described with respect to FIGS. 1 through 9, values are arranged in a matrix, the values resulting from the subtraction operation, wherein the subtraction operation subtracts the median value established over time for each patch from the mean value of the instant frame being ingested.

Operation 1504 illustrates obtaining a static matrix which, when crossed with the variable matrix, will more evenly distribute the transformed values. For example, as shown in and/or described with respect to FIGS. 1 through 9, a matrix may be determined based upon mathematical analysis of previously-obtained data sets related to hash values. The matrix may be optimized mathematically such that, when used as an operand in a dot product operation with successive variable matrices, the corresponding successive result matrices will include values that are more evenly spread along a distribution curve than the variable matrices prior to the dot product operation.

Operation 1506 illustrates computing a dot product of the variable matrix and the static matrix, the dot product including at least the more evenly-distributed transformed values. For example, as shown in and/or described with respect to FIGS. 1 through 9, the variable matrix containing values resulting from the subtraction operation may be crossed with a static matrix that has been predetermined to distribute data represented by a variable matrix more evenly, such that the resulting matrices are more spread out instead of being bunched about a particular portion of the distribution.

FIG. 16 illustrates alternative embodiments of the example operational flow 1000 of FIG. 10. FIG. 16 illustrates an example embodiment where operation 1504 may include at least one additional operation 1602.

Operation 1602 illustrates determining, using locality-sensitive hashing at least partially based on one or more previously obtained hash values, a static matrix which, when crossed with a variable matrix, will more evenly distribute the transformed values of the variable matrix. For example, as shown in and/or described with respect to FIGS. 1 through 9, a locality-sensitive hashing technique may be used to analyze previously-ingested video samples, producing a matrix such that, when used as an operand in a dot product operation with successive variable matrices, the corresponding successive result matrices will include values that are more evenly spread along a distribution curve than the variable matrices prior to the dot product operation.

FIG. 17 illustrates alternative embodiments of the example operational flow 1000 of FIG. 10. FIG. 17 illustrates an example embodiment where operation 1010 may include at least one additional operation. Additional operations may include operation 1702, and/or operation 1704.

Operation 1702 illustrates constructing a hash value from the transformed values, including at least reducing the fidelity of the transformed values via reducing each transformed value to a binary representation. For example, as shown in and/or described with respect to FIGS. 1 through 9, each value of the resultant matrix from the dot product operation may be reduced from, for example, an 8-bit value from 0 to 255 (or from −127 to 128) to a single bit, being either a one or a zero.

Operation 1702 may include operation 1704. Operation 1704 illustrates determining for each transformed value whether the transformed value is a positive number and, if the transformed value is a positive number, assigning a one to the hash value and otherwise assigning a zero to the hash value. For example, as shown in and/or described with respect to FIGS. 1 through 9, each value of the resultant matrix from the dot product operation between 1 and 128 may be reduced to a bit value of 1, and each value of the resultant matrix from the dot product operation between −127 and 0 may be reduced to a bit value of 0.

FIG. 18 illustrates alternative embodiments of the example operational flow 1000 of FIG. 10. FIG. 18 illustrates an example embodiment where operation 1012 may include at least one additional operation 1802.

Operation 1802 illustrates referencing a number of most significant bits of the constructed hash value to determine a database server, wherein the number of most significant bits is pre-determined to address a plurality of database servers, wherein a number of database servers associated with the number of most significant bits is established to enable at least one index associated with a database sector to reside entirely in memory of a corresponding database server. For example, as shown in and/or described with respect to FIGS. 1 through 9, a number of most significant bits of 2 may be selected, whereby the 2 bits may provide four different values (00, 01, 10, and 11), each of which may be assigned to a different database sector. The number of most significant bits of a hash value may be established to provide a sufficient number of servers such that a content associated with a plurality of hash values may fit entirely in the memory of a particular database sector, which may be a database server, a cluster partner, a virtual machine, and/or another type of database node. The number of bits does not have to, but may, exactly represent the maximum number of database sectors at any given time (i.e. while 6 bits may be selected to provide for addressing of up to 64 database sectors, the system may be operable with fewer servers e.g. 60 sectors, or with the maximum 64 sectors).

FIG. 19 illustrates alternative embodiments of the example operational flow 1000 of FIG. 10. FIG. 19 illustrates an example embodiment where operation 1014 may include at least one additional operation 1902.

Operation 1902 illustrates storing at least the hash value on the determined database sector, including at least storing at least one indication of a channel, at least one indication of a video segment, and at least one indication of a timecode offset from the beginning of the video segment at a database location at least partially based on the hash value. For example, as shown in and/or described with respect to FIGS. 1 through 9, data associated with a video segment (which may be a program title and/or other metadata associated with a video segment), the channel from which the program was ingested, and an offset in time from the start of the program may be stored, either along with the hash value or in a location associated with and/or referenceable by the hash value, the storage being in the same or different sector, server, or database as the hash value.

FIG. 20 illustrates an operational flow 2000 representing example operations related to addressing a media database using distance associative hashing. In FIG. 20 and in following figures that include various examples of operational flows, discussion and explanation may be provided with respect to the above-described examples of FIGS. 1 through 9, and/or with respect to other examples and contexts. However, it should be understood that the operational flows may be executed in a number of other environments and contexts, and/or in modified versions of FIGS. 1 through 9. Also, although the various operational flows are presented in the sequence(s) illustrated, it should be understood that the various operations may be performed in other orders than those which are illustrated, or may be performed concurrently.

After a start operation, the operational flow 2000 moves to operation 2002. Operation 2002 depicts receiving a cue, the cue constructed via one or more operations associated with a media storage operation. For example, as shown in and/or described with respect to FIGS. 1 through 9, at least some data is received which is associated with a sample of video data taken from a particular client system. The data may be associated with exactly the same patches of the client system as are defined by the ingest operation. The data may be algorithmically processed to arrive at a hash value using the same operations as the ingest operation. Accordingly, if a particular frame associated with a particular time offset of a particular program on a particular channel is ingested and hashed, resulting in a hash value associated with that particular frame, should that particular frame also be sampled while being displayed on a client system, the same hashing operations as applied to the ingested frame will result in the same hash value as resulted from the hashing operations on the ingested frame. But in contrast to the hash value prepared during the ingest, the cue of operation 2002 represents data associated with a sample of video data from a particular client system. A cue may be received via, for example, an HTTP request.

Then, operation 2004 depicts referencing a number of most significant bits of the received cue to determine a database sector. For example, as shown in and/or described with respect to FIGS. 1 through 9, the same bits of the cue are examined as defined by the number of most significant bits used to reference a database sector during ingest. For example, if the first two bits of the hash value at ingest are used for storing the hash value at a particular database sector, the same first two bits of the cue associated with a sample of video data from a client system are used for addressing a particular database sector.

Then, operation 2006 depicts returning at least one indication of at least one candidate from the database sector based at least partially on the received cue. For example, as shown in and/or described with respect to FIGS. 1 through 9, hash values which exactly match the cue, or are nearby the cue, are returned as one or more of suspects or candidates. Candidates may be returned within a particular percentage radius. Candidates may be returned according to a nearest neighbor algorithm or a modified nearest neighbor algorithm.

FIG. 21 illustrates alternative embodiments of the example operational flow 2000 of FIG. 20. FIG. 21 illustrates an example embodiment where operation 2002 may include at least one additional operation. Additional operations may include operation 2102, operation 2104, and/or operation 2106.

Operation 2102 illustrates receiving a cue associated with a sample of a video buffer of a client system, including at least receiving one or more indications related to an epoch time associated with the sample of the video buffer of the client system. For example, as shown in and/or described with respect to FIGS. 1 through 9, a cue may include, or be associated with, a time offset from an arbitrary time. The time offset may be computed from Jan. 1, 1970, for example.

Operation 2104 illustrates receiving a cue, the cue associated with a sample of a video buffer of a client system, the cue at least partially determined by hashing at least some values associated with the video buffer. For example, as shown in and/or described with respect to FIGS. 1 through 9, patches associated with a video buffer may be reduced to a bit string via one or more mathematical operations or algorithms using one or more operands as constants, the constants pre-derived via operations described elsewhere herein with respect to hashing, for example.

Operation 2106 illustrates receiving a cue, the cue associated with a sample of a video buffer of a client system, the cue at least partially determined by hashing at least some values associated with the video buffer, the hashing based at least partially one or more of at least one operand or at least one algorithm also utilized in an associated media storage operation. For example, as shown in and/or described with respect to FIGS. 1 through 9, at least some data associated with a sample of a video buffer representing what is displayed by a television screen at a particular quantum of time is processed via operations utilized by the ingest process and/or in conjunction with data locations common to the ingest process and/or involving constant values for operands utilized by the ingest process. For example, the number of patches analyzed at ingest may also be utilized in providing a cue associated with a particular client system. The size of pixel patches analyzed at ingest may also be utilized in providing a cue associated with a particular client system. The same pre-derived static matrix used to more evenly distribute hash values at ingest may also be used during hashing of the data associated with a particular client system.

FIG. 22 illustrates alternative embodiments of the example operational flow 2000 of FIG. 20. FIG. 22 illustrates an example embodiment where operation 2002 may include at least one additional operation. Additional operations may include operation 2202, operation 2204, operation 2206, operation 2208, operation 2210, operation 2212, and/or operation 2214.

Operation 2202 illustrates receiving one or more indications of at least one content of a video buffer of a client system. For example, as shown in and/or described with respect to FIGS. 1 through 9, pixel values for red, green, and blue pixels at every pixel location at every pre-defined patch of the video buffer of the client system may be read, for every frame, or for every third frame, or for every tenth frame, or for every second, or at some other interval. The indications (pixel values or other data) may be received by a widget on the television, by control logic on the television, by a system coupled with the media server, or elsewhere.

Operation 2204 illustrates determining, for at least one patch of the at least one content of the video buffer including at least one or more pixels of the at least one patch, an algorithmically-derived value of the one or more pixels of each patch. For example, as shown in and/or described with respect to FIGS. 1 through 9, pixel values for red, green, and blue pixels at every pixel location at every pre-defined patch of the video buffer of the client system may be averaged.

Operation 2206 illustrates subtracting a median point value from the mean value for each patch. For example, as shown in and/or described with respect to FIGS. 1 through 9, median point values at each patch established through analysis of ingested content are determined. The median point values for each patch may, for example, be provided to the client system once determined by a system associated with the media database and ingest system. The median point values may be updated from time to time (hourly, daily, monthly, yearly). The median point values provided for hashing data associated with a video buffer of a client system may be the same median point values utilized to hash incoming content at ingest.

Operation 2208 illustrates transforming the values resulting from the subtraction. For example, as shown in and/or described with respect to FIGS. 1 through 9, values resulting from the subtraction are populated in a matrix and crossed with a pre-defined static matrix. The dot-product operation crossing the two matrices may be conducted at the client system during a process of converting pixel patch data associated with a frame in a video buffer to a cue, such that a cue is sent in an HTTP request rather than the actual pixel patch data, resulting in a compact HTTP message. The pre-defined static matrix may be provided to the client system in advance of the transform, and may be the same matrix as was produced to distribute hashed values at ingest more evenly. The pre-defined static matrix may be updated at the client system from time to time. Alternatively, patch data may be sent, with or without other metadata, from a client system (television, e.g.) to a different system for processing and/or hashing.

Operation 2210 illustrates constructing a hash value from the transformed values. For example, as shown in and/or described with respect to FIGS. 1 through 9, the values in the matrix resulting from crossing the matrix with values associated with the video buffer with the pre-derived static matrix may be reduced to bits, with a single bit replacing each 8-bit value in the matrix. In other embodiments, the constructed hash value may include a different number of bits for each value in the matrix. In different embodiments, the constructed hash value may have the same number of bits as the values in the matrix, or may be a direct representation of the values in the matrix.

Operation 2212 illustrates associating the cue at least partially with the constructed hash value. For example, as shown in and/or described with respect to FIGS. 1 through 9, the string of bits constructed from the transformed matrix may be a cue, or may associate the constructed string of bits with a time (such as an epoch time) to form a cue, or may associate other data such as an IP address or other identifier associated with the client television or a widget of the client television to form a cue. Alternatively, the cue may include or otherwise be associated with any other metadata associated with audiovisual content at the client system.

Operation 2214 illustrates at least one of the determining 2204, subtracting 2206, transforming 2208, or constructing 2210 operations utilize one or more of at least one operand or at least one algorithm also utilized in an associated media storage operation. For example, as shown in and/or described with respect to FIGS. 1 through 9, one or more parameters including one or more of a definition of a number of pixel patches, a definition of a size of pixel patches, a pre-defined median value associated with pixel patches, or a pre-defined static matrix may be provided to a client TV, the one or more parameters also utilized by the ingest process such that operations applied to a sample from a video buffer will result in the same hash value that would result when that frame (e.g. same video segment and time offset) was ingested and hashed.

FIG. 23 illustrates alternative embodiments of the example operational flow 2000 of FIG. 20. FIG. 23 illustrates an example embodiment where operation 2006 may include at least one additional operation. Additional operations may include operation 2302, and/or operation 2304.

Operation 2302 illustrates returning at least one indication of at least one candidate from the database sector based at least partially on a probabilistic point location in equal balls ("PPLEB") algorithm as a function of the received cue. For example, as shown in and/or described with respect to FIGS. 1 through 9, at least one of candidates or suspects representing path points close to a cue (e.g. neighbors, nearest neighbors, within a radius, from within the same bucket, belonging to the same ring, etc.) are returned from a media database constructed and/or modified via an ingest process.

Operation 2304 illustrates returning at least one indication of at least one candidate from the database sector based at least partially on the received cue, the at least one candidate being within a predetermined inverse percentage distribution radius of the received cue. For example, as shown in and/or described with respect to FIGS. 1 through 9, at least one of candidates or suspects associated with locality sensitive hashing related to at least one of a cue or a hash value are returned.

FIG. 24 illustrates an operational flow 2400 representing example operations related to addressing a media database using distance associative hashing. In FIG. 24 and in following figures that include various examples of operational flows, discussion and explanation may be provided with respect to the above-described examples of FIGS. 1 through 9, and/or with respect to other examples and contexts. However, it should be understood that the operational flows may be executed in a number of other environments and contexts, and/or in modified versions of FIGS. 1 through 9. Also, although the various operational flows are presented in the sequence(s) illustrated, it should be understood that the various operations may be performed in other orders than those which are illustrated, or may be performed concurrently.

After a start operation, the operational flow 2400 moves to operation 2402. Operation 2402 depicts receiving at least one indication of at least one candidate and at least one indication of at least one cue. For example, as shown in and/or described with respect to FIGS. 1 through 9, a hash value related to a video buffer of a client system, along with one or more associated candidates or suspects is determined.

Then, operation 2404 depicts adding a token to a bin associated with at least one received candidate. For example, as shown in and/or described with respect to FIGS. 1 through 9, scoring of candidates is performed via tokens added to bins corresponding to candidates/suspects, the token being, for example, a value which is incremented each time a token is added.

Then, operation 2406 depicts determining whether a number of tokens in a bin exceeds a value associated with a probability that a client system is displaying a particular video segment associated with at least one cue and, if the number of tokens in a bin exceeds a value associated with a probability that a client system is display a particular video segment associated with at least one cue, returning at least some data associated with the particular video segment based at least partially on the bin. For example, as shown in and/or described with respect to FIGS. 1 through 9, a determination of a particular video segment and particular offset of the video segment is probabilistically determined via the scoring associated with the bins.

FIG. 25 illustrates alternative embodiments of the example operational flow 2400 of FIG. 24. FIG. 25 illustrates an example embodiment where operation 2404 may include at least one additional operation 2502.

Operation 2502 illustrates adding a token to a time bin associated with at least one received candidate. For example, as shown in and/or described with respect to FIGS. 1 through 9, a data structure associated with a candidate/suspect may include an arbitrary time bin grouped by an arbitrary time.

FIG. 26 illustrates alternative embodiments of the example operational flow 2400 of FIG. 20. FIG. 26 illustrates an example embodiment where operation 2404 may include at least one additional operation. Additional operations may include operation 2602, and/or operation 2604. Further, operational flow 2400 may include at least one additional operation 2606.

Operation 2602 illustrates determining a relative time, including at least subtracting a candidate time associated with the at least one candidate from an arbitrary time associated with the at least one cue. For example, as shown in and/or described with respect to FIGS. 1 through 9, a time offset of a video segment associated with a candidate is subtracted from an arbitrary time associated with an epoch time related to the cue received from a client system (television, set-top box, or article, machine, or composition of matter displaying and/or providing and/or receiving video content).

Operation 2604 illustrates adding a token to a time bin associated with the candidate based at least partially on the determined relative time. For example, as shown in and/or described with respect to FIGS. 1 through 9, when a cue point associated with the client system matches or nearly matches a reference cue point associated with a media database, a token may be added to a bin, which may include incrementing a value associated with a bin or another means of tracking bin operations.

Operation 2606 illustrates removing one or more tokens from a time bin based at least partially on a time period elapsing. For example, as shown in and/or described with respect to FIGS. 1 through 9, a bin may be leaky such that data and/or tokens associated with old suspects/candidates may be release from the bin, which may include decrementing a value associated with a bin or another means of tracking bin operations.

In varying embodiments, pixel locations may relate to one or many colors and/or color spaces/models (e.g. red, blue, green; red, blue, green, and yellow; cyan, magenta, yellow, and black; a single pixel value uniquely identifying a color e.g. a 24-bit value associated with a pixel location; hue, saturation, brightness; etc.). Differing numbers of pixels in a patch may be used, and the patch does not have to be a square patch. Further, resolution of the video buffer of the client system may vary. Resolutions and/or color densities at the client system and the ingest system may vary. The system may be operable with various raster resolutions, including but not limited to 1920 by 1080, 3840 by 2160, 1440×1080, 1366×768, or other resolutions. It is expected that over the next two decades, increases in pixel resolution of common programming, televisions, and/or client systems will occur; the same basic operations may be utilized although pixel patch number, size, sampling rate, or other aspects may vary. Further, an up-conversion, down-conversion, or other transformation operation associated with resolution and/or color density may occur and/or be interposed between other operations described herein.

FIG. 27 illustrates an example system 2700 in which embodiments may be implemented. The system 2700 includes one or more computing devices 2702. The system 2700 also illustrates a fabric 2704 for facilitating communications among one or more computing devices and one or more client devices 2706. The system 2700 also illustrates one or more client devices 2706. In some embodiments, the one or more client devices may be among the one or more computing devices. The system 2700 also illustrates at least one non-transitory computer-readable medium 2708. In some embodiments, 2708 may include one or more instructions 2710 that, when executed on at least some of the one or more computing devices, cause at least some of the one or more computing devices to at least receive at least one stream of rasterized video; create at least one hash value associated with at least one sample of at least one received rasterized video stream; determine at least one database sector for storing a created at least one hash value; and store a created at least one hash value on at least one determined database sector. In differing embodiments, the one or more instructions may be executed on a single computing device. In other embodiments, some portions of the one or more instructions may be executed by a first plurality of the one or more computing devices, while other portions of the one or more instructions may be executed by a second plurality of the one or more computing devices.

FIG. 28 illustrates an example system 2800 in which embodiments may be implemented. The system 2800 includes one or more computing devices 2802. The system 2800 also illustrates a fabric 2804 for facilitating communications among one or more computing devices and one or more client devices 2806. The system 2800 also illustrates one or more client devices 2806. In some embodiments, the one or more client devices may be among the one or more computing devices. The system 2800 also illustrates at least one non-transitory computer-readable medium 2808. In some embodiments, 2808 may include one or more instructions 2810 that, when executed on at least some of the one or more computing devices, cause at least some of the one or more computing devices to at least receive one or more indications associated with at least one video buffer of at least one client system; determine a cue based at least partially on the at least one video buffer and at least one epoch time associated with the at least one video buffer, wherein one or more of at least one operand or at least one function associated with determining the cue is also utilized in an associated media storage operation; reference a number of most significant bits of a determined cue to determine a database sector; and return at least one indication of at least one candidate from a determined database sector based at least partially on a determined cue. In differing embodiments, the one or more instructions may be executed on a single computing device. In other embodiments, some portions of the one or more instructions may be executed by a first plurality of the one or more computing devices, while other portions of the one or more instructions may be executed by a second plurality of the one or more computing devices.

FIG. 29 illustrates an example system 2900 in which embodiments may be implemented. The system 2900 includes one or more computing devices 2902. The system 2900 also illustrates a fabric 2904 for facilitating communications among one or more computing devices and one or more client devices 2906. The system 2900 also illustrates one or more client devices 2906. In some embodiments, the one or more client devices may be among the one or more computing devices. The system 2900 also illustrates at least one non-transitory computer-readable medium 2908. In some embodiments, 2908 may include one or more instructions 2910 that, when executed on at least some of the one or more computing devices, cause at least some of the one or more computing devices to at least receive at least one indication of at least one candidate and at least one indication of at least one cue; add a token to a bin associated with at least one received candidate; and determine whether a number of tokens in a bin exceeds a value associated with a probability that a client system is receiving a particular video segment associated with at least one received cue and, if the number of tokens in a bin exceeds a value associated with a probability that a client system is receiving a particular video segment associated with at least one received cue, returning at least some data associated with the particular video segment based at least partially on the bin. In differing embodiments, the one or more instructions may be executed on a single computing device. In other embodiments, some portions of the one or more instructions may be executed by a first plurality of the one or more computing devices, while other portions of the one or more instructions may be executed by a second plurality of the one or more computing devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real-time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

Furthermore, computers or computing means referred to in the specification may include a single processor or may employ multiple-processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language or operating systems. It is appreciated that a variety of programming languages and operating systems may be used to implement the teachings of the present invention as described herein.

The system and methods, flow diagrams, and structure block diagrams described in this specification may be implemented in computer processing systems including program code comprising program instructions that are executable by a computer processing system. Other implementations may also be used. Additionally, the flow diagrams and structure block diagrams herein described describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a suitable communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Processors suitable for the execution of a computer program include, by way of example only and without limitation, both general and special purpose microprocessors, and any one or more processors of any kind of digital computer. Generally, a processor will receive instructions and data from a read only memory or a random access memory or both.

To provide for interaction with a user or manager of the system described herein, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes back end component(s) including one or more data servers, or that includes one or more middleware components such as application servers, or that includes a front end component such as a client computer having a graphical user interface or a Web browser through which a user or administrator can interact with some implementations of the subject matter described is this specification, or any combination of one or more such back end, middleware, or front end components. The components of the system can be interconnected by any form or medium of digital data communication, such as a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method comprising:
receiving a pixel cue point associated with a frame of an unknown video segment, wherein the pixel cue point includes a set of pixel values corresponding to the frame;
identifying a plurality of bins, wherein a bin facilitates identification of a candidate video segment;
identifying candidate reference data points in a database of reference data points, wherein identified candidate reference data points are similar to the pixel cue point, and wherein a candidate reference data point includes one or more pixel values corresponding to a candidate frame of a candidate video segment;
adding a first token to a first bin associated with a first candidate video segment, wherein the first token is added to the first bin in response to identifying a first candidate reference data point;
adding a second token to a second bin associated with a second candidate video segment, wherein the second token is added to the second bin in response to identifying a second candidate reference data point;
determining that a quantity of tokens in the first bin exceeds a value, wherein the value is associated with a probability that the first candidate video segment matches the unknown video segment;
identifying the unknown video segment as matching the first candidate video segment when the quantity of tokens in the first bin exceeds the value; and
transmitting data associated with the first candidate video segment when the unknown video segment is identified.

2. The computer-implemented method of claim 1, further comprising:
removing one or more tokens from the first bin when a time period has elapsed.

3. The computer-implemented method of claim 1, wherein the pixel cue point includes an average value of the set of pixel values, and wherein the set of pixel values includes an array of pixel values extracted from the frame of the unknown video segment.

4. The computer-implemented method of claim 1, wherein a candidate reference data point is similar to the pixel cue point when the one or more pixel values corresponding to the candidate frame are within a pixel value range of the set of pixel values corresponding to the frame.

5. The computer-implemented method of claim 1, further comprising:
determining content associated with the candidate video segment;
retrieving the content from a database; and
transmitting the retrieved content, wherein the retrieved content is addressed to a media system, and wherein the pixel cue point is received from the media system.

6. The computer-implemented method of claim 1, further comprising:
removing one or more tokens from the first bin when an action occurs to change a source of video data, wherein the pixel cue point is derived from the source of video data.

7. The computer-implemented method of claim 6, wherein the action includes changing a first source of video data to a second source of video data, rewinding the unknown video segment, fast forwarding the unknown video segment, or pausing the unknown video segment.

8. A system comprising:
one or more processors; and
a non-transitory computer-readable medium containing instructions that, when executed by the one or more processors, cause the one or more processors to perform operations including:
receiving a pixel cue point associated with a frame of an unknown video segment, wherein the pixel cue point includes a set of pixel values corresponding to the frame;
identifying a plurality of bins, wherein a bin facilitates identification of a candidate video segment;
identifying candidate reference data points in a database of reference data points, wherein identified candidate reference data points are similar to the pixel cue point, and wherein a candidate reference data point includes one or more pixel values corresponding to a candidate frame of a candidate video segment;
adding a first token to a first bin associated with a first candidate video segment, wherein the first token is added to the first bin in response to identifying a first candidate reference data point;
adding a second token to a second bin associated with a second candidate video segment, wherein the second token is added to the second bin in response to identifying a second candidate reference data point;
determining that a quantity of tokens in the first bin exceeds a value, wherein the value is associated with a probability that the first candidate video segment matches the unknown video segment;
identifying the unknown video segment as matching the first candidate video segment when the quantity of tokens in the first bin exceeds the value; and
transmitting data associated with the first candidate video segment when the unknown video segment is identified.

9. The system of claim 8, further comprising instructions that, when executed by the one or more processors, cause the one or more processors to perform operations including:
removing one or more tokens from the first bin when a time period has elapsed.

10. The system of claim 8, wherein the pixel cue point includes an average value of the set of pixel values, and wherein the set of pixel values includes an array of pixel values extracted from the frame of the unknown video segment.

11. The system of claim 8, wherein a candidate reference data point is similar to the pixel cue point when the one or more pixel values corresponding to the candidate frame are within a pixel value range of the set of pixel values corresponding to the frame.

12. The system of claim 8, further comprising instructions that, when executed by the one or more processors, cause the one or more processors to perform operations including:

determining content associated with the candidate video segment;

retrieving the content from a database; and transmitting the retrieved content, wherein the retrieved content is addressed to a media system, and wherein the pixel cue point is received from the media system.

13. The system of claim 8, further comprising instructions that, when executed by the one or more processors, cause the one or more processors to perform operations including:

removing one or more tokens from the first bin when an action occurs to change a source of video data, wherein the pixel cue point is derived from the source of video data.

14. The system of claim 13, wherein the action includes changing a first source of video data to a second source of video data, rewinding the unknown video segment, fast forwarding the unknown video segment, or pausing the unknown video segment.

15. A computer-program product tangibly embodied in a non-transitory machine-readable storage medium, including instructions that, when executed by one or more processors, cause the one or more processors to:

receive a pixel cue point associated with a frame of an unknown video segment, wherein the pixel cue point includes a set of pixel values corresponding to the frame;

identify a plurality of bins, wherein a bin facilitates identification of a candidate video segment;

identify candidate reference data points in a database of reference data points, wherein identified candidate reference data points are similar to the pixel cue point, and wherein a candidate reference data point includes one or more pixel values corresponding to a candidate frame of a candidate video segment;

add first token to a first bin associated with a first candidate video segment, wherein the first token is added to the first bin in response to identifying a first candidate reference data point;

add a second token to a second bin associated with a second candidate video segment, wherein the second token is added to the second bin in response to identifying a second candidate reference data point;

determine that a quantity of tokens in the first bin exceeds a value, wherein the value is associated with a probability that the first candidate video segment matches the unknown video segment;

identify the unknown video segment as matching the first candidate video segment when the quantity of tokens in the first bin exceeds the value; and transmitting data associated with the first candidate video segment when the unknown video segment is identified.

16. The computer-program product of claim 15, further including instructions that, when executed by the one or more processors, cause the one or more processors to:

remove one or more tokens from the first bin when a time period has elapsed.

17. The computer-program product of claim 15, wherein a candidate reference data point is similar to the pixel cue point when the one or more pixel values corresponding to the candidate frame are within a pixel value range of the set of pixel values corresponding to the frame.

18. The computer-program product of claim 15, further including instructions that, when executed by the one or more processors, cause the one or more processors to:

determine content associated with the candidate video segment;

retrieve the content from a database; and transmit the retrieved content, wherein the retrieved content is addressed to a media system, and wherein the pixel cue point is received from the media system.

19. The computer-program product of claim 15, further including instructions that, when executed by the one or more processors, cause the one or more processors to:

remove one or more tokens from the first bin when an action occurs to change a source of video data, wherein the pixel cue point is derived from the source of video data.

20. The computer-program product of claim 19, wherein the action includes changing a first source of video data to a second source of video data, rewinding the unknown video segment, fast forwarding the unknown video segment, or pausing the unknown video segment.

* * * * *